United States Patent
Mihalcik et al.

(10) Patent No.: US 12,005,413 B2
(45) Date of Patent: *Jun. 11, 2024

(54) FIRE-CLASS REINFORCED AEROGEL COMPOSITIONS

(71) Applicant: Aspen Aerogels, Inc.

(72) Inventors: David Mihalcik, Northborough, MA (US); Kathryn Elizabeth deKrafft, Marlborough, MA (US); Nicholas Anthony Zafiropoulos, Wayland, MA (US); Owen Richard Evans, Chelmsford, MA (US); George L. Gould, Mendon, MA (US); Wibke Lolsberg, Ludwigshafen am Rhein (DE)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,067

(22) Filed: Nov. 16, 2022

(65) Prior Publication Data

US 2023/0085627 A1    Mar. 23, 2023

Related U.S. Application Data

(63) Continuation of application No. 16/425,825, filed on May 29, 2019, now Pat. No. 11,547,977.

(Continued)

(51) Int. Cl.
*B01J 13/00* (2006.01)
*C01B 33/158* (2006.01)
(Continued)

(52) U.S. Cl.
CPC ....... *B01J 13/0091* (2013.01); *C01B 33/1585* (2013.01); *C08K 5/0066* (2013.01);
(Continued)

(58) Field of Classification Search
CPC ............ B01J 13/0091; C01B 33/1585; C08K 5/0066; C08L 61/28; C08L 75/04; C08L 2201/02
See application file for complete search history.

(56) References Cited

U.S. PATENT DOCUMENTS 2,117,605 A    5/1938   Fowler et al.
2,188,007 A    1/1940   Kistler
(Continued)

FOREIGN PATENT DOCUMENTS

BR    112020024176 A2    3/2021
CA         3101986 A1    12/2019
(Continued)

OTHER PUBLICATIONS

"U.S. Appl. No. 16/425,825, Examiner Interview Summary dated Oct. 25, 2022", 2 pgs.

(Continued)

*Primary Examiner* — Robert S Jones, Jr.
*Assistant Examiner* — Jiangtian Xu
(74) *Attorney, Agent, or Firm* — Schwegman Lundberg & Woessner, P.A.

(57) ABSTRACT

The current disclosure provides reinforced aerogel compositions that are durable and easy to handle, have favorable performance in aqueous environments, have favorable insulation properties, and have favorable, reaction to fire, combustion and flame-resistance properties. Also provided are methods of preparing or manufacturing such reinforced aerogel compositions. In certain embodiments, the composition has a silica-based aerogel framework, reinforced with an open-cell macroporous framework, and includes one or more fire-class additives, where the silica-based aerogel (Continued)

framework comprises at least one hydrophobic-bound silicon and the composition or each of its components has desired properties.

24 Claims, 2 Drawing Sheets

Related U.S. Application Data

(60) Provisional application No. 62/678,850, filed on May 31, 2018.

(51) Int. Cl.
*C08K 5/00* (2006.01)
*C08L 61/28* (2006.01)
*C08L 75/04* (2006.01)

(52) U.S. Cl.
CPC ............... *C08L 61/28* (2013.01); *C08L 75/04* (2013.01); *C08L 2201/02* (2013.01)

(56) References Cited

U.S. PATENT DOCUMENTS

| | | |
|---|---|---|
| 2,739,134 A | 3/1956 | Parry et al. |
| 2,789,095 A | 4/1957 | Lindvig |
| 2,811,499 A | 10/1957 | Hervey |
| 2,831,820 A | 4/1958 | Aase et al. |
| 2,920,983 A | 1/1960 | John |
| 2,926,390 A | 3/1960 | Anselm et al. |
| 2,936,294 A | 5/1960 | Kohrn |
| 2,993,869 A | 7/1961 | Gmitter et al. |
| 3,025,200 A | 3/1962 | Powers |
| 3,055,360 A | 9/1962 | William |
| 3,057,750 A | 10/1962 | Bailey et al. |
| 3,060,137 A | 10/1962 | Gemeinhardt et al. |
| 3,075,926 A | 1/1963 | Stewart et al. |
| 3,082,611 A | 3/1963 | Alvis et al. |
| 3,090,094 A | 5/1963 | Schwartzwalder et al. |
| 3,094,433 A | 6/1963 | John et al. |
| 3,112,524 A | 12/1963 | Bobby |
| 3,129,191 A | 4/1964 | Nickerson et al. |
| 3,171,820 A | 3/1965 | Volz |
| 3,342,922 A | 9/1967 | John et al. |
| 3,386,877 A | 6/1968 | Skochdopole et al. |
| 3,459,274 A | 8/1969 | Macphail |
| 3,504,064 A | 3/1970 | Bauer |
| 3,506,600 A | 4/1970 | Zocco et al. |
| 3,650,993 A | 3/1972 | Zocco et al. |
| 3,860,537 A | 1/1975 | Graham et al. |
| 3,953,566 A | 4/1976 | Gore |
| 4,252,517 A | 2/1981 | Milford et al. |
| 4,363,738 A | 12/1982 | Kummermehr |
| 4,447,345 A | 5/1984 | Kummermehr et al. |
| 4,454,248 A | 6/1984 | Pollock et al. |
| 4,532,316 A | 7/1985 | Henn |
| 4,610,863 A | 9/1986 | Tewari et al. |
| 4,619,908 A | 10/1986 | Cheng et al. |
| 4,666,948 A | 5/1987 | Woerner et al. |
| 4,667,417 A | 5/1987 | Graser et al. |
| 4,717,708 A | 1/1988 | Cheng et al. |
| 4,904,328 A | 2/1990 | Beecher et al. |
| 4,966,919 A | 10/1990 | Williams, Jr. et al. |
| 5,026,591 A | 6/1991 | Henn et al. |
| 5,037,859 A | 8/1991 | Williams, Jr. et al. |
| 5,124,101 A | 6/1992 | Hirao et al. |
| 5,124,364 A | 6/1992 | Wolff et al. |
| 5,137,927 A | 8/1992 | Wolff et al. |
| 5,229,429 A | 7/1993 | Hahn et al. |
| 5,275,796 A | 1/1994 | Tillotson et al. |
| 5,306,555 A | 4/1994 | Ramamurthi et al. |
| 5,395,805 A | 3/1995 | Droege et al. |
| 5,420,168 A | 5/1995 | Mayer et al. |
| 5,502,156 A | 3/1996 | St, Clair et al. |
| 5,520,960 A | 5/1996 | Rancourt et al. |
| 5,565,142 A | 10/1996 | Deshpande et al. |
| 5,569,513 A | 10/1996 | Fidler et al. |
| 5,631,097 A | 5/1997 | Andersen et al. |
| 5,683,772 A | 11/1997 | Andersen et al. |
| 5,691,392 A | 11/1997 | Okoroafor et al. |
| 5,786,059 A | 7/1998 | Frank et al. |
| 5,789,075 A | 8/1998 | Frank et al. |
| 5,814,405 A | 9/1998 | Branca et al. |
| 5,830,387 A | 11/1998 | Yokogawa et al. |
| 5,866,027 A | 2/1999 | Frank et al. |
| 5,889,071 A | 3/1999 | Biesmans et al. |
| 5,962,539 A | 10/1999 | Perrut et al. |
| 5,972,254 A | 10/1999 | Sander |
| 5,973,015 A | 10/1999 | Coronado et al. |
| 6,034,146 A | 3/2000 | Falke et al. |
| 6,040,375 A | 3/2000 | Behme et al. |
| 6,068,882 A | 5/2000 | Ryu |
| 6,080,219 A | 6/2000 | Jha et al. |
| 6,080,475 A | 6/2000 | Frank et al. |
| 6,083,619 A | 7/2000 | Frank et al. |
| 6,087,407 A | 7/2000 | Coronado et al. |
| 6,121,336 A | 9/2000 | Okoroafor et al. |
| 6,136,216 A | 10/2000 | Fidler et al. |
| 6,140,377 A | 10/2000 | Schwertfeger et al. |
| 6,147,134 A | 11/2000 | Eling |
| 6,187,250 B1 | 2/2001 | Champagne |
| 6,187,831 B1 | 2/2001 | Miller et al. |
| 6,197,270 B1 | 3/2001 | Sonoda et al. |
| 6,315,971 B1 | 11/2001 | Wallace et al. |
| 6,316,092 B1 | 11/2001 | Frank et al. |
| 6,399,669 B1 | 6/2002 | Suzuki et al. |
| 6,479,416 B1 | 11/2002 | Frank et al. |
| 6,544,618 B1 | 4/2003 | Smith |
| 6,620,355 B1 | 9/2003 | Schmidt |
| 6,656,527 B1 | 12/2003 | Gessner et al. |
| 6,670,402 B1 | 12/2003 | Lee et al. |
| 6,719,947 B1 | 4/2004 | Jha et al. |
| 6,770,584 B2 | 8/2004 | Barney et al. |
| 6,887,563 B2 | 5/2005 | Frank et al. |
| 6,989,123 B2 | 1/2006 | Lee et al. |
| 7,071,287 B2 | 7/2006 | Rhine et al. |
| 7,074,880 B2 | 7/2006 | Rhine et al. |
| 7,078,359 B2 | 7/2006 | Stepanian et al. |
| 7,101,607 B2 | 9/2006 | Mollendorf et al. |
| 7,112,234 B2 | 9/2006 | Jha et al. |
| 7,118,801 B2 | 10/2006 | Ristic-Lehmann et al. |
| 7,399,439 B2 | 7/2008 | Lee et al. |
| 7,504,346 B2 | 3/2009 | Stepanian et al. |
| 7,780,890 B2 | 8/2010 | Lee et al. |
| 7,781,492 B2 | 8/2010 | Williams et al. |
| 7,816,413 B2 | 10/2010 | Feaver et al. |
| 7,833,916 B2 | 11/2010 | Leeser et al. |
| 7,977,411 B2 | 7/2011 | Williams et al. |
| 8,105,512 B1 | 1/2012 | Lucas et al. |
| 8,214,980 B2 | 7/2012 | Bullock et al. |
| 8,453,393 B2 | 6/2013 | Schroth et al. |
| 8,546,457 B2 | 10/2013 | Alteheld et al. |
| 8,691,883 B2 | 4/2014 | Cho et al. |
| 8,937,106 B2 | 1/2015 | Steinke et al. |
| 9,077,041 B2 | 7/2015 | Burnside et al. |
| 9,199,394 B2 | 12/2015 | Brown et al. |
| 9,605,427 B2 | 3/2017 | Besselievre et al. |
| 9,868,843 B2 | 1/2018 | Evans et al. |
| 10,227,472 B2 | 3/2019 | Evans et al. |
| 10,233,302 B2 | 3/2019 | Evans et al. |
| 10,233,303 B2 | 3/2019 | Evans et al. |
| 10,253,159 B2 | 4/2019 | Evans et al. |
| 11,547,977 B2 | 1/2023 | Mihalcik et al. |
| 2002/0094426 A1 | 7/2002 | Stepanian et al. |
| 2003/0003284 A1 | 1/2003 | Schwertfeger et al. |
| 2004/0142149 A1 | 7/2004 | Mollendorf et al. |
| 2005/0046086 A1 | 3/2005 | Lee et al. |
| 2005/0100728 A1 | 5/2005 | Ristic-Lehmann et al. |
| 2005/0192366 A1 | 9/2005 | Ou et al. |
| 2005/0192367 A1 | 9/2005 | Ou et al. |
| 2006/0054296 A1 | 3/2006 | Eriksson |
| 2006/0240216 A1 | 10/2006 | Stepanian et al. |
| 2006/0263587 A1 | 11/2006 | Ou et al. |

(56) References Cited

U.S. PATENT DOCUMENTS

| | | |
|---|---|---|
| 2006/0264132 A1 | 11/2006 | Leeser et al. |
| 2006/0269734 A1 | 11/2006 | Krajewski et al. |
| 2006/0286360 A1 | 12/2006 | Rhine et al. |
| 2007/0014979 A1 | 1/2007 | Bullock et al. |
| 2007/0128391 A1 | 6/2007 | Giacobone et al. |
| 2007/0152363 A1 | 7/2007 | Begag et al. |
| 2007/0173157 A1 | 7/2007 | Trifu et al. |
| 2007/0213417 A1 | 9/2007 | Stork et al. |
| 2007/0259979 A1 | 11/2007 | Lee |
| 2007/0272902 A1 | 11/2007 | Evans et al. |
| 2008/0057334 A1 | 3/2008 | Schroth et al. |
| 2008/0214690 A1 | 9/2008 | Komatsu et al. |
| 2008/0229704 A1 | 9/2008 | Augustyniak et al. |
| 2008/0287561 A1 | 11/2008 | Dalzell et al. |
| 2009/0029109 A1 | 1/2009 | Seth et al. |
| 2009/0029147 A1* | 1/2009 | Tang ..................... C08J 9/0066 521/142 |
| 2010/0080949 A1 | 4/2010 | Ou et al. |
| 2010/0089551 A1 | 4/2010 | Quadbeck-Seeger et al. |
| 2011/0252739 A1 | 10/2011 | Leeser et al. |
| 2012/0064287 A1 | 3/2012 | Park et al. |
| 2012/0094062 A1 | 4/2012 | Park et al. |
| 2012/0097907 A1 | 4/2012 | Bauer et al. |
| 2012/0112117 A1 | 5/2012 | Vo et al. |
| 2012/0128958 A1 | 5/2012 | Zeng et al. |
| 2012/0142240 A1 | 6/2012 | Eling et al. |
| 2012/0142802 A1 | 6/2012 | Steinke et al. |
| 2012/0142804 A1 | 6/2012 | Blackwell |
| 2012/0169016 A1 | 7/2012 | Hisano et al. |
| 2013/0171439 A1 | 7/2013 | Shoseyov et al. |
| 2013/0196137 A1 | 8/2013 | Evans et al. |
| 2013/0337255 A1 | 12/2013 | Steinke et al. |
| 2013/0344279 A1 | 12/2013 | Doshi et al. |
| 2014/0044929 A1 | 2/2014 | Evans et al. |
| 2014/0110332 A1 | 4/2014 | Hirai et al. |
| 2014/0128488 A1 | 5/2014 | Lotti et al. |
| 2014/0287641 A1 | 9/2014 | Steiner, III |
| 2014/0349057 A1 | 11/2014 | Blackford et al. |
| 2015/0114696 A1 | 4/2015 | Hong et al. |
| 2016/0032584 A1 | 2/2016 | Doshi et al. |
| 2016/0096949 A1 | 4/2016 | Evans et al. |
| 2016/0115685 A1 | 4/2016 | Bonnardel et al. |
| 2016/0347924 A1 | 12/2016 | Min et al. |
| 2017/0210092 A1 | 7/2017 | Rikleen et al. |
| 2017/0210093 A1 | 7/2017 | Rikleen et al. |
| 2018/0094114 A1 | 4/2018 | Evans et al. |
| 2018/0112057 A1 | 4/2018 | Evans et al. |
| 2018/0112058 A1 | 4/2018 | Evans et al. |
| 2018/0134867 A1 | 5/2018 | Evans et al. |
| 2019/0203014 A1 | 7/2019 | Evans et al. |
| 2019/0374921 A1 | 12/2019 | Mihalcik et al. |

FOREIGN PATENT DOCUMENTS

| | | |
|---|---|---|
| CN | 102583407 A | 7/2012 |
| CN | 112512679 A | 3/2021 |
| CN | 112512679 B | 4/2023 |
| CN | 116532055 A | 8/2023 |
| DE | 102010033379 A1 | 2/2012 |
| EP | 0340707 A2 | 11/1989 |
| EP | 1808454 A2 | 7/2007 |
| EP | 2397513 A2 | 12/2011 |
| EP | 3801868 A1 | 4/2021 |
| GB | 2464369 A | 4/2010 |
| HK | 40041715 A | 8/2021 |
| JP | H0834678 A | 2/1996 |
| JP | 2002059443 A | 2/2002 |
| JP | 2002275305 A | 9/2002 |
| JP | 2004306571 A | 11/2004 |
| JP | 2010047710 A | 3/2010 |
| JP | 2011005676 A | 1/2011 |
| JP | 2012225409 A | 11/2012 |
| JP | 2014040750 A | 3/2014 |
| JP | 2016074841 A | 5/2016 |
| JP | 2017036745 A | 2/2017 |
| JP | 2017533163 A | 11/2017 |
| JP | 2021525699 A | 9/2021 |
| KR | 20210014675 A | 2/2021 |
| RU | 2161143 C2 | 12/2000 |
| SG | 11202011338 | 12/2020 |
| WO | WO-9710188 A1 | 3/1997 |
| WO | WO-0194436 A2 | 12/2001 |
| WO | WO-2008051029 A1 | 5/2008 |
| WO | WO-2012021499 A1 | 2/2012 |
| WO | WO-2012076492 A1 | 6/2012 |
| WO | WO-2013014683 A1 | 1/2013 |
| WO | WO-2016054524 A2 | 4/2016 |
| WO | WO-2019232087 A1 | 12/2019 |

OTHER PUBLICATIONS

"U.S. Appl. No. 16/425,825, Final Office Action dated Apr. 20, 2022", 21 pgs.

"U.S. Appl. No. 16/425,825, Non Final Office Action dated Apr. 14, 2021", 7 pgs.

"U.S. Appl. No. 16/425,825, Non Final Office Action dated Sep. 7, 2022", 19 pgs.

"U.S. Appl. No. 16/425,825, Notice of Allowance dated Nov. 23, 2022", 14 pgs.

"U.S. Appl. No. 16/425,825, Response filed Feb. 19, 2021 to Restriction Requirement dated Jan. 13, 2021", 13 pgs.

"U.S. Appl. No. 16/425,825, Response filed Jun. 3, 2022 to Final Office Action dated Apr. 20, 2022", 14 pgs.

"U.S. Appl. No. 16/425,825, Response filed Aug. 11, 2021 to Non Final Office Action dated Apr. 14, 2021", 18 pgs.

"U.S. Appl. No. 16/425,825, Response filed Oct. 21, 2022 to Non Final Office Action dated Sep. 7, 2022", 12 pgs.

"U.S. Appl. No. 16/425,825, Restriction Requirement dated Jan. 13, 2021", 7 pgs.

"U.S. Appl. No. 16/425,825, Third-Party Submission filed Jun. 16, 2020", 34 pgs.

"Brazilian Application Serial No. BR112020024176-8, Office Action dated Jan. 23, 2023", with English claims, 9 pgs.

"Chinese Application Serial No. 201980050544.X, Office Action dated Jun. 20, 2022", w/ English Translation, 10 pgs.

"Chinese Application Serial No. 201980050544.X, Response filed Jan. 6, 2023", with English claims, 12 pgs.

"Chinese Application Serial No. 201980050544.X, Response filed Nov. 7, 2022 to Office Action dated Jun. 20, 2022", with machine translation, 7 pgs.

"Chinese Application Serial No. 201980050544.X, Response filed Dec. 28, 2022", with English claims, 12 pgs.

"Chinese Application Serial No. 202310347878.1, Notification to Make Rectification dated Apr. 28, 2023", with machine translation, 3 pgs.

"European Application Serial No. 19731087.3, Communication pursuant to Article 94(3) EPC dated Jun. 29, 2022", 6 pgs.

"European Application Serial No. 19731087.3, Response filed Sep. 30, 2022 to Communication pursuant to Article 94(3) EPC dated Jun. 29, 2022", 8 pgs.

"European Application Serial No. 19731087.3, Response to Communication pursuant to Rules 161(1) and 162 EPC filed Jul. 29, 2021", 13 pgs.

"Indian Application Serial No. 202037051240, First Examination Report dated Mar. 14, 2022", 8 pgs.

"Indian Application Serial No. 202037051240, Response filed Sep. 13, 2022 to First Examination Report dated Mar. 14, 2022", 12 pgs.

"Indonesian Application Serial No. P00202009001, Response filed Dec. 28, 2022", with machine translation and English claims, 242 pgs.

"Indonesian Application Serial No. P00202214421, Response filed Dec. 8, 2022", with English claims, 240 pgs.

"International Application Serial No. PCT/US2019/034448, International Preliminary Report on Patentability dated Dec. 10, 2020", 16 pgs.

"International Application Serial No. PCT/US2019/034448, International Search Report dated Nov. 6, 2019", 8 pgs.

(56) References Cited

OTHER PUBLICATIONS

"International Application Serial No. PCT/US2019/034448, Invitation to Pay Additional Fees dated Sep. 12, 2019", 18 pgs.

"International Application Serial No. PCT/US2019/034448, Written Opinion dated Nov. 6, 2019", 14 pgs.

"Japanese Application Serial No. 2020-566921, Notification of Reasons for Refusal dated Jan. 10, 2023", w/ English Translation, 10 pgs.

"Russian Application Serial No. 201810967520.8, Official Action dated Nov. 17, 2022", w/ English Translation, 13 pgs.

"Russian Application Serial No. 201810967520.8, Response filed Mar. 27, 2023 to Official Action dated Nov. 17, 2022", with English claims, 20 pgs.

Chen, Z, "Preparation and characteristics of composite phase change material (CPCM) with SiO2 and diatomite as endothermal-hydroscopic material", Energy and Buildings, vol. 86, (2015), 1-6.

Dohnalova, et al., "Characterization of Kaolin Dispersion using Acoustic and Electroacoustic Spectroscopy", Journal of Mining and Metallurgy Section B Metallurgy 44(1), (2008), 10 pgs.

Eslah, Sanaz, et al., "Electrospinning and characterization of poly (vinyl alcohol)-sericin nanofibers as a potential for tissue engineering applications", The Journal of the Textile Institute, 2016, vol. 107, No. 8, (Aug. 6, 2015), 949-957.

Gharehbagh, et al., "Polyurethane Flexible Foam Fire Behavior", INTECH, (2012), 101-120.

Guao, Jiao, "Clay reinforced polyimide/silica hybrid aerogel", Journal of materials chemistry A vol. 1 No. 24, (May 7, 2013), 7211-7221.

Kistler, S. S, "Coherent Expanded-Aerogels", The Journal of Physical Chemistry, vol. 36, No. 1, (Jan. 1, 1932), 52-64.

Liu, Hongli, et al., "Novel Three-Dimensional Halloysite Nanotubes/Silica Composite Aerogels with Enhanced Mechanical Strength and Low Thermal Conductivity Prepared At Ambient Pressure", Journal Of Sol-Gel Science And Technology, Springer, 2016, vol. 80, No. 3, (2016), 651-659.

"Brazilian Application Serial No. BR112020024176-8, Response filed Jun. 9, 2023 to Office Action dated Jan. 23, 2023", with machine translation, 17 pgs.

"Indonesian Application Serial No. P00202214421, Substantive Examination Report dated Jul. 24, 2023", with machine Translation, 6 pgs.

"Japanese Application Serial No. 2020-566921, Response filed Jul. 10, 2023 to Notification of Reasons for Refusal dated Jan. 10, 2023", with English claims, 44 pgs.

"Russian Application Serial No. 2020143275, Office Action dated May 24, 2023", with English translation, 12 pgs.

"Russian Application Serial No. 2020143275, Response filed Sep. 15, 2023 to Office Action dated May 24, 2023", with English claims, 19 pgs.

Singapore Application Serial No. 11202011338T, Search Report and Written Opinion dated Oct. 18, 2023, 10 pgs.

\* cited by examiner and nonobvious invention.
FIRE-CLASS REINFORCED AEROGEL COMPOSITIONS

CROSS-REFERENCES TO RELATED APPLICATIONS

This application is a continuation of U.S. patent application. Ser. No. 16/425,825, filed on May 29, 2019 and which claims the benefit of priority from U.S. Provisional Patent Application No. 62/678,850 filed on May 31, 2018, both of which are incorporated herein by reference in their entireties, with any definition of terms in the present application controlling.

BACKGROUND OF THE INVENTION

1. Field of the Invention

This invention relates, generally, to aerogel technology. More specifically, it relates to aerogel compositions with fire-class additives.

2. Brief Description of the Related Art

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

However, what are needed are fire-class reinforced aerogel compositions with improved performance in various aspects, including in thermal resistance, hydrophobicity, fire reaction and others, individually and in one or more combinations. In view of the art considered as a whole at the time the present invention was made, though, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for improved aerogel compositions is now met by a new, useful, and nonobvious invention.

In an embodiment, the current invention is a reinforced aerogel composition comprising a silica-based aerogel framework, reinforced with an open-cell macroporous framework ("OCMF") material, and a fire-class additive, where the silica-based aerogel framework comprises at least one hydrophobic-bound silicon.

In one general aspect, the present disclosure provides reinforced aerogel compositions that are durable and easy to handle, which has favorable performance in aqueous environments, which has favorable insulation properties, and that also has favorable combustion and flame-resistance properties. In certain embodiments, the present disclosure presents a reinforced aerogel composition that is reinforced with an OCMF, which has favorable performance in aqueous environments, which has favorable insulation properties, and that also has favorable combustion and flame-resistance properties.

In another general aspect, the present disclosure provides a reinforced aerogel composition comprising a silica-based aerogel framework and an OCMF, and which has the following properties: a) a thermal conductivity of 30 mW/m*K or less; b) a liquid water uptake of 30 wt % or less; and c) a heat of combustion of 717 cal/g or less. In certain embodiments, a reinforced aerogel composition of the present disclosure has the following properties: a) a thermal conductivity of 25 mW/m*K or less; b) a liquid water uptake of 20 wt % or less; and c) a heat of combustion of 717 cal/g or less. In certain embodiments, a reinforced aerogel composition of the present disclosure has a density of 0.40 g/cm3 or less, 0.30 g/cm3 or less, 0.25 g/cm3 or less, or 0.20 g/cm3 or less. In certain embodiments, reinforced aerogel compositions of the present disclosure have a thermal conductivity of 25 mW/M*K or less, 20 mW/M*K or less, 18 mW/M*K or less, a thermal conductivity between 15 mW/M*K and 30 mW/M*K, or a thermal conductivity between 15 mW/M*K and 20 mW/M*K. In certain embodiments, a reinforced aerogel composition of the present disclosure has a liquid water uptake of 30 wt % or less, 25 wt % or less, 20 wt % or less, 15 wt % or less, 10 wt % or less, or 5 wt % or less. In certain embodiments, a reinforced aerogel composition of the present disclosure has a heat of combustion of 717 cal/g or less, 700 cal/g or less, 675 cal/g or less, 650 cal/g or less, 625 cal/g or less, 600 cal/g or less, or a heat of combustion between 580 cal/g and 717 cal/g. In certain specific aspects, combination of the values described above in thermal conductivity, water uptake and heat of combustion are achieved by varying gel precursor composition, additive composition, catalyst or other agents that activate the precursor, pH of the precursor solution, dispensing rate, respectively of precursors, catalyst or additives, time allowed for gelation to take place, winding of gel (in certain aspects), ageing time and pH, any post-gelation treatment, extraction time and conditions (temperature, pressure) and any subsequent drying steps.

In another general aspect, the present disclosure provides reinforced aerogel compositions comprising a silica-based aerogel framework, a melamine-based OCMF, and a fire-class additive, and has the following properties: a) a thermal conductivity between 15 mW/M*K and 30 mW/M*K; b) a liquid water uptake of 30 wt % or less; and c) a heat of combustion between 580 cal/g and 717 cal/g. In a certain preferred embodiments, the OCMF material is an organic OCMF material. In another certain preferred embodiments, the OCMF material is a melamine-based OCMF material. In certain embodiments, a reinforced aerogel compositions of the present disclosure has a hydrophobic organic content between about 1 wt % and about 30 wt %, between about 1 wt % and about 25 wt %, between about 1 wt % and about 20 wt %, between about 1 wt % and about 15 wt %, between about 1 wt % and about 10 wt %, or between about 1 wt % and about 5 wt %.

In another general aspect, the present disclosure provides a method of preparing a reinforced aerogel composition, comprising a) providing a precursor solution comprising silica gel precursor materials, a solvent, and optionally a catalyst; b) combining the precursor solution with a reinforcement material comprising an OCMF; c) allowing the silica gel precursor materials in the precursor solution to transition into a gel material or composition; and d) extracting at least a portion of the solvent from the gel material or composition to obtain an aerogel material or composition. In certain embodiments, methods of the present disclosure include incorporating a fire-class additive material into the reinforced aerogel composition by combining the fire-class additive material with the precursor solution either before or during the transition of the silica gel precursor materials in the precursor solution into the gel composition. In a preferred embodiment, the reinforcement material comprises a melamine-based OCMF material. In certain embodiments, methods of the present disclosure include incorporating at least one hydrophobic-bound silicon into the aerogel material or composition by one or both of the following: i) including in the precursor solution at least one silica gel precursor material having at least one hydrophobic group, or ii) exposing the precursor solution, gel composition, or aerogel composition to a hydrophobizing agent. In certain embodiments, methods of the present disclosure include the step of incorporating at least one hydrophobic-bound silicon into the aerogel composition providing a hydrophobic organic content in the aerogel composition of between about 1 wt % and about 25 wt %, between about 1 wt % and about 20 wt %, between about 1 wt % and about 15 wt %, between about 1 wt % and about 10 wt %, or between about 1 wt % and about 5 wt %. In a preferred embodiment, methods of the present disclosure produce a reinforced aerogel composition. In certain embodiments, methods of the present disclosure produce a reinforced aerogel composition comprising a silica-based aerogel framework, a melamine-based OCMF, and a fire-class additive, and which has the following properties: a) a thermal conductivity between 15 mW/M*K and 30 mW/M*K; b) a liquid water uptake of 30 wt % or less; and c) a heat of combustion between 580 cal/g and 717 cal/g.

Additionally, the following specific, non-limiting embodiments/examples are disclosed. The enumerated examples are presented to illustrate a certain range of embodiments that are contemplated herein, including a combination of such embodiments or examples. The invention as described in the claims have scope beyond these non-limiting examples.

Embodiment 1 is a reinforced aerogel composition comprising a silica-based aerogel framework, reinforced with an OCMF material, and a fire-class additive; wherein the silica-based aerogel framework comprises at least one hydrophobic-bound silicon; and wherein the reinforced aerogel composition has the following properties: i) liquid water uptake of 20 wt % or less; ii) thermal conductivity of 30 mW/M*K or less; and iii) heat of combustion of less than 717 cal/g.

Embodiment 2 is a reinforced aerogel composition comprising a silica-based aerogel framework, reinforced with an OCMF material with a density of between 2 kg/m$^3$ and 25 kg/m$^3$, and a fire-class additive; wherein the silica-based aerogel framework comprises at least one hydrophobic-bound silicon; and wherein the reinforced aerogel composition has the following properties: i) liquid water uptake of 20 wt % or less; ii) thermal conductivity of 30 mW/M*K or less; and iii) heat of combustion of less than 717 cal/g.

Embodiment 3 is a reinforced aerogel composition comprising a silica-based aerogel framework, reinforced with an OCMF material with a density of 2 kg/m$^3$ and 25 kg/m$^3$, and a fire-class additive; wherein the silica-based aerogel framework comprises at least one hydrophobic-bound silicon; and wherein the reinforced aerogel composition has the following properties: i) liquid water uptake of between 1 wt % and 10 wt %; ii) thermal conductivity of more than 8 and less than 25 mW/M*K; and iii) heat of combustion of less than 717 cal/g and more than 400 cal/g.

Embodiment 4 is a reinforced OCMF composition reinforced with a silica-based aerogel composition and a fire class additive; wherein the silica-based aerogel framework comprises at least one hydrophobic-bound silicon; and wherein the reinforced aerogel composition has the following properties: i) liquid water uptake of 20 wt % or less; ii) thermal conductivity of 30 mW/M*K or less; and iii) heat of combustion of less than 717 cal/g.

Embodiment 5 is a reinforced OCMF composition reinforced with a silica-based aerogel composition and a fire class additive; wherein the silica-based aerogel framework comprises at least one hydrophobic-bound silicon; and wherein the reinforced aerogel composition has the following properties: i) liquid water uptake of 20 wt % or less; ii) thermal conductivity of 30 mW/M*K or less; and iii) heat of combustion of less than 717 cal/g.

Embodiment 6 is a reinforced OCMF composition reinforced with a silica-based aerogel composition and a fire class additive; wherein the silica-based aerogel framework comprises at least one hydrophobic-bound silicon; and wherein the reinforced aerogel composition has the following properties: i) liquid water uptake of between 1 wt % and 10 wt %; ii) thermal conductivity of more than 8 and less than 25 mW/M*K; and iii) heat of combustion of less than 717 cal/g and more than 400 cal/g.

Embodiment 7 is a set of embodiments with the reinforced aerogel composition of any one of embodiments 1-3 or reinforced OCMF composition of any one of embodiments 4-6, wherein the OCMF material comprises or is an organic OCMF material.

Embodiment 8 is a set of embodiments with the reinforced aerogel composition of any one of embodiments 1-3 or reinforced OCMF composition of any one of embodiments 4-6, wherein the OCMF material comprises or is a melamine based OCMF material.

Embodiment 9 is a set of embodiments with the reinforced aerogel composition of any one of embodiment 1-3 or reinforced OCMF composition of any one of embodiments 4-6, wherein the OCMF material comprises or is a sheet of OCMF material.

Embodiment 10 is a set of embodiments with the reinforced aerogel composition of any one of embodiment 1-3 or reinforced OCMF composition of any one of embodiments 4-6, wherein the OCMF material is an organic foam.

Embodiment 11 is a set of embodiments with the reinforced aerogel composition of any one of embodiment 1-3 or reinforced OCMF composition of any one of embodiments 4-6, wherein the OCMF material is a melamine based foam.

Embodiment 12 is a set of embodiments with the reinforced aerogel composition or reinforced OCMF composition of any one of embodiments 1-11, wherein the OCMF material is neither a low-combustible material nor a non-combustible material.

Embodiment 13 is a set of embodiments with the reinforced aerogel composition or reinforced OCMF composition of any one of embodiments 1-11, wherein the OCMF material is neither a low-flammable material nor a non-flammable material.

Embodiment 14 is a set of embodiments with the reinforced aerogel composition or reinforced OCMF composition of any one of embodiments 1-11, wherein the OCMF material comprises between 2 wt % and 10 wt % of the composition.

Embodiment 15 is a set of embodiments with the reinforced aerogel composition or reinforced OCMF composition of any one of embodiments 1-14, wherein the hydrophobic silicon-bound content in the composition is between 2 wt % and 10 wt %.

Embodiment 16 is a set of embodiments with the reinforced aerogel composition or reinforced OCMF composition of any one of embodiments 1-14, wherein the hydrophobic silicon-bound content in the composition is between 2 wt % and 8 wt %.

Embodiment 17 is a set of embodiments with the reinforced aerogel composition or reinforced OCMF composition of any one of embodiments 1-14, wherein the hydrophobic silicon-bound content in the composition is between 2 wt % and 6 wt %.

Embodiment 18 is a set of embodiments with the reinforced aerogel composition or reinforced OCMF composition of any one of embodiments 1-17, wherein the composition has a heat of combustion of 700 cal/g or less.

Embodiment 19 is a set of embodiments with the reinforced aerogel composition or reinforced OCMF composition of any one of embodiments 1-17, wherein the composition has a heat of combustion of 675 cal/g or less.

Embodiment 20 is a set of embodiments with the reinforced aerogel composition or reinforced OCMF composition of any one of embodiments 1-17, wherein the composition has a heat of combustion of 650 cal/g or less.

Embodiment 21 is a set of embodiments with the reinforced aerogel composition or reinforced OCMF composition of any one of embodiments 1-17, wherein the composition has a heat of combustion of 625 cal/g or less.

Embodiment 22 is a set of embodiments with the reinforced aerogel composition or reinforced OCMF composition of any one of embodiments 1-21, wherein the composition has a thermal conductivity of 22 mW/M*K or less.

Embodiment 23 is a set of embodiments with the reinforced aerogel composition or reinforced OCMF composition of any one of embodiments 1-21, wherein the reinforced aerogel composition has a thermal conductivity of 20 mW/M*K or less.

Embodiment 24 is a set of embodiments with the reinforced aerogel composition or reinforced OCMF composition of any one of embodiments 1-21, wherein the reinforced aerogel composition has a thermal conductivity of 18 mW/M*K or less.

Embodiment 25 is a set of embodiments with the reinforced aerogel composition or reinforced OCMF composition of any one of embodiments 1-21, wherein the reinforced aerogel composition has a density between 0.15 and 0.40 g/cm3.

Embodiment 26 is a set of embodiments with the reinforced aerogel composition or reinforced OCMF composition of any one of embodiments 1-21, wherein the reinforced aerogel composition has an onset of thermal decomposition of 350° C. or above.

Embodiment 27 is a set of embodiments with the reinforced aerogel composition or reinforced OCMF composition of any one of embodiments 1-21, wherein the reinforced aerogel composition has an onset of thermal decomposition of 360° C. or above.

Embodiment 28 is a set of embodiments with the reinforced aerogel composition or reinforced OCMF composition of any one of embodiments 1-21, wherein the reinforced aerogel composition has an onset of thermal decomposition of 370° C. or above.

Embodiment 29 is a set of embodiments with the reinforced aerogel composition or reinforced OCMF composition of any one of embodiments 1-21, wherein the reinforced aerogel composition has an onset of thermal decomposition of 380° C. or above.

Embodiment 30 is a set of embodiments with the reinforced aerogel composition or reinforced OCMF composition of any one of embodiments 1-21, wherein the reinforced aerogel composition has an onset of thermal decomposition of 390° C. or above.

Embodiment 31 is an organic OCMF reinforced aerogel composition comprising fire class additives and hydrophobic organic content wherein the onset of endothermic decomposition of the fire class additives in the composition is within 50 degrees Celsius of the onset of thermal decomposition of the rest of the composition without the fire class additive.

Embodiment 32 is an organic OCMF reinforced aerogel composition comprising fire class additives and hydrophobic content of at least 5% wherein the total heat of endothermic decomposition of the fire class additives in the composition is at least 30% of the exothermic heat of decomposition of the rest of the composition without the fire class additive.

Embodiment 33 is an organic OCMF reinforced aerogel composition comprising at least two fire class additives with their respective onset of endothermic decomposition are at least 10 degrees Celsius apart.

Embodiment 34 is an organic OCMF reinforced aerogel composition comprising fire class additives and hydrophobic content wherein the total heat of endothermic decomposition of the fire class additives in the composition is no more than 80% of the exothermic heat of decomposition of the rest of the composition without the fire class additive.

Embodiment 35 is a set of embodiments with the reinforced aerogel composition or reinforced OCMF composition of any one of embodiments 1-11, wherein the hydrophobic content is at least 5% and the total heat of endothermic decomposition of the fire class additives in the composition is at least 30% of the exothermic heat of decomposition of the rest of the composition without the fire class additive.

Embodiment 36 is a set of embodiments with the reinforced aerogel composition or reinforced OCMF composition of any one of embodiments 1-11, wherein the onset of endothermic decomposition of the fire class additives in the composition is within 50 degrees Celsius of the onset of thermal decomposition of the rest of the composition without the fire class additive.

Embodiment 37 is a set of embodiments with the reinforced aerogel composition or reinforced OCMF composition of any one of embodiments 1-11, with at least two fire class additives wherein the two fire class additives respective onset of endothermic decomposition are at least 10 degrees Celsius apart.

Embodiment 38 is a set of embodiments with the reinforced aerogel composition or reinforced OCMF composition of any one of embodiments 1-11, wherein the total heat of endothermic decomposition of the fire class additives in the composition is no more than 80% of the exothermic heat of decomposition of the rest of the composition without the fire class additive.

Embodiment 39 is a set of embodiments with the composition of any one of embodiments 1-38, wherein the furnace temperature rise of the composition in accordance with ISO 1182 is about 100° C. or less, about 90° C. or less, about 80° C. or less, about 70° C. or less, about 60° C. or less, about 50° C. or less, about 45° C. or less, about 40° C. or less, about 38° C. or less, about 36° C. or less, about 34° C. or less, about 32° C. or less, about 30° C. or less, about 28° C. or less, about 26° C. or less, about 24° C. or less, or in a range between any two of these values.

Embodiment 40 is a set of embodiments with the composition of any one of embodiments 1-39, wherein the flame time of the composition in accordance with ISO 1182 is about 30 seconds or less, about 25 seconds or less, about 20 seconds or less, about 15 seconds or less, about 10 seconds or less, about 5 seconds or less, about 2 seconds or less, or in a range between any two of these values.

Embodiment 41 is a set of embodiments with the composition of any one of embodiments 1-40, wherein the mass loss of the composition in accordance with ISO 1182 is about 50% or less, about 40% or less, about 30% or less, about 28% or less, about 26% or less, about 24% or less, about 22% or less, about 20% or less, about 18% or less, about 16% or less, or in a range between any two of these values.

Embodiment 42 is a set of embodiments with the composition of any one of the above embodiments, wherein the composition is low-flammable.

Embodiment 43 is a set of embodiments with the composition of any one of the above embodiments, wherein the composition is non-flammable.

Embodiment 44 is a set of embodiments with the composition of any one of the above embodiments, wherein the composition is low-combustible.

Embodiment 45 is a set of embodiments with the composition of any one of the above embodiments, wherein the composition is non-combustible.

Embodiment 46 is a set of embodiments with the composition of any one of the above embodiments, wherein the onset of endothermic decomposition of the fire class additive is greater than 280° C., 300° C., 350° C., 400° C., 450° C. or 500° C.

Embodiment 47 is a set of embodiments with the composition of any one of the above embodiments, wherein the onset of exothermic decomposition of the composition without the fire class additive is greater than 280° C., 300° C., 350° C., 400° C., 450° C. or 500° C.

Embodiment 48 is a set of embodiments with the composition of any one of the above embodiments, wherein the OCMF material is a melamine based foam.

Embodiment 49 is a set of embodiments with the composition of any one of the above embodiments, wherein the OCMF material is a urethane based polymer foam.

Embodiment 50 is a set of embodiments with the composition of any one of the above claims, wherein the OCMF material is a reticulated foam.

Furthermore, aerogel materials or framework of the various embodiments of the present invention may also be practiced with aerogel particle based slurries or suspensions infiltrated into the OCMF materials described in various embodiments. In yet another embodiment, various embodiments of the present invention may be practiced with non-particulate aerogel materials produced in-situ by infiltrating the OCMF materials with various gel precursors in suitable solvent and followed by the removal of the solvent using various methods, including using supercritical fluids, or at elevated temperatures and ambient pressures or at sub-critical pressures.

In separate embodiments, the current invention includes a reinforced aerogel composition or OCMF-reinforced composition, comprising one or more—or even all—of the foregoing features and characteristics, including various combinations and methods of manufacture thereof.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

DETAILED DESCRIPTION OF THE PREFERRED EMBODIMENTS

Figure 1:
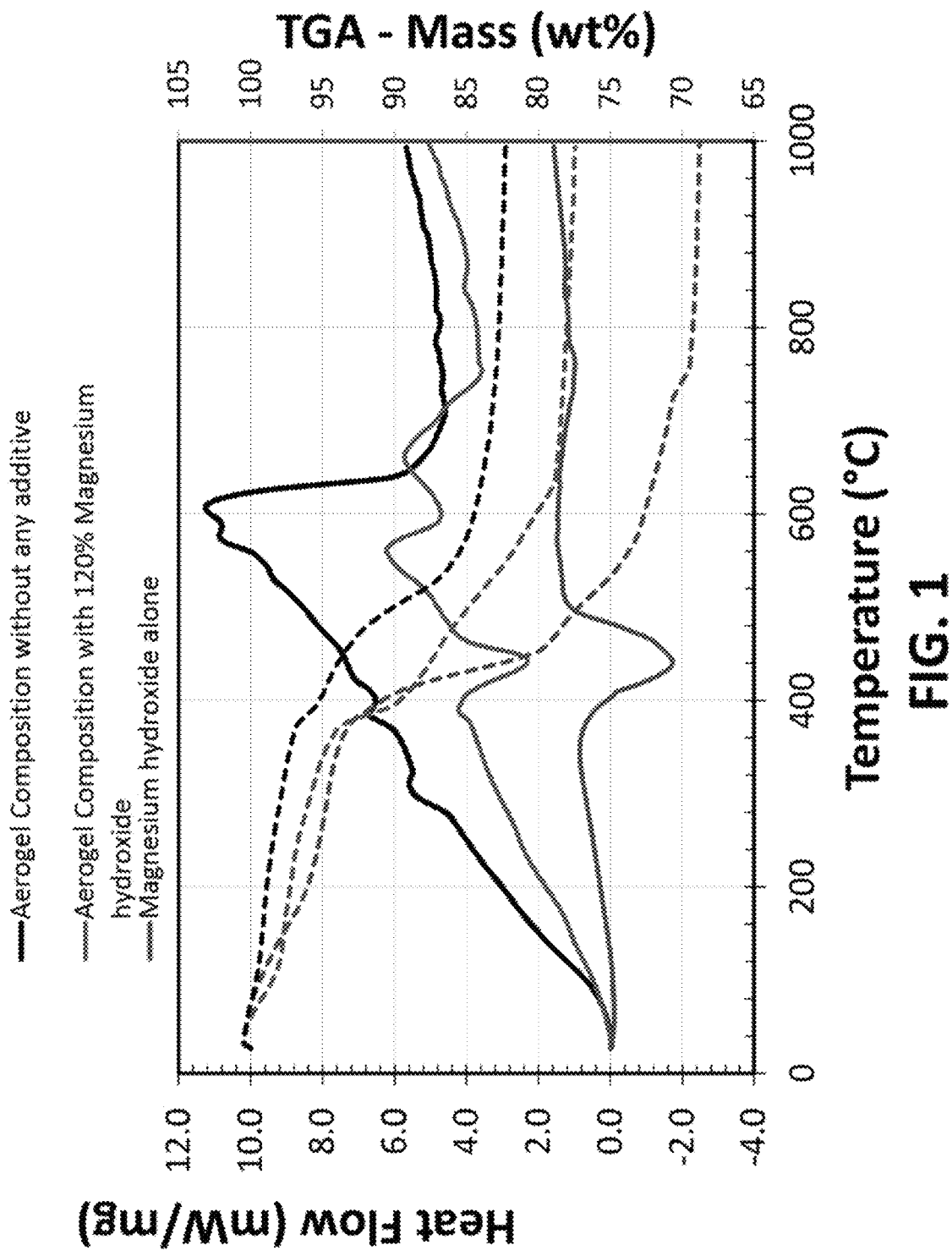
FIG. 1 depicts thermogravimetric analysis (TGA) and differential scanning calorimetry (DSC) measurements for an aerogel composition without any additives, a hydrophobic aerogel composition of the present invention reinforced with melamine foam, with about 120% of magnesium hydroxide, with 100% reference being the weight of silica and hydrophobe constituents of the aerogel composition (Example 3).
Figure 2:
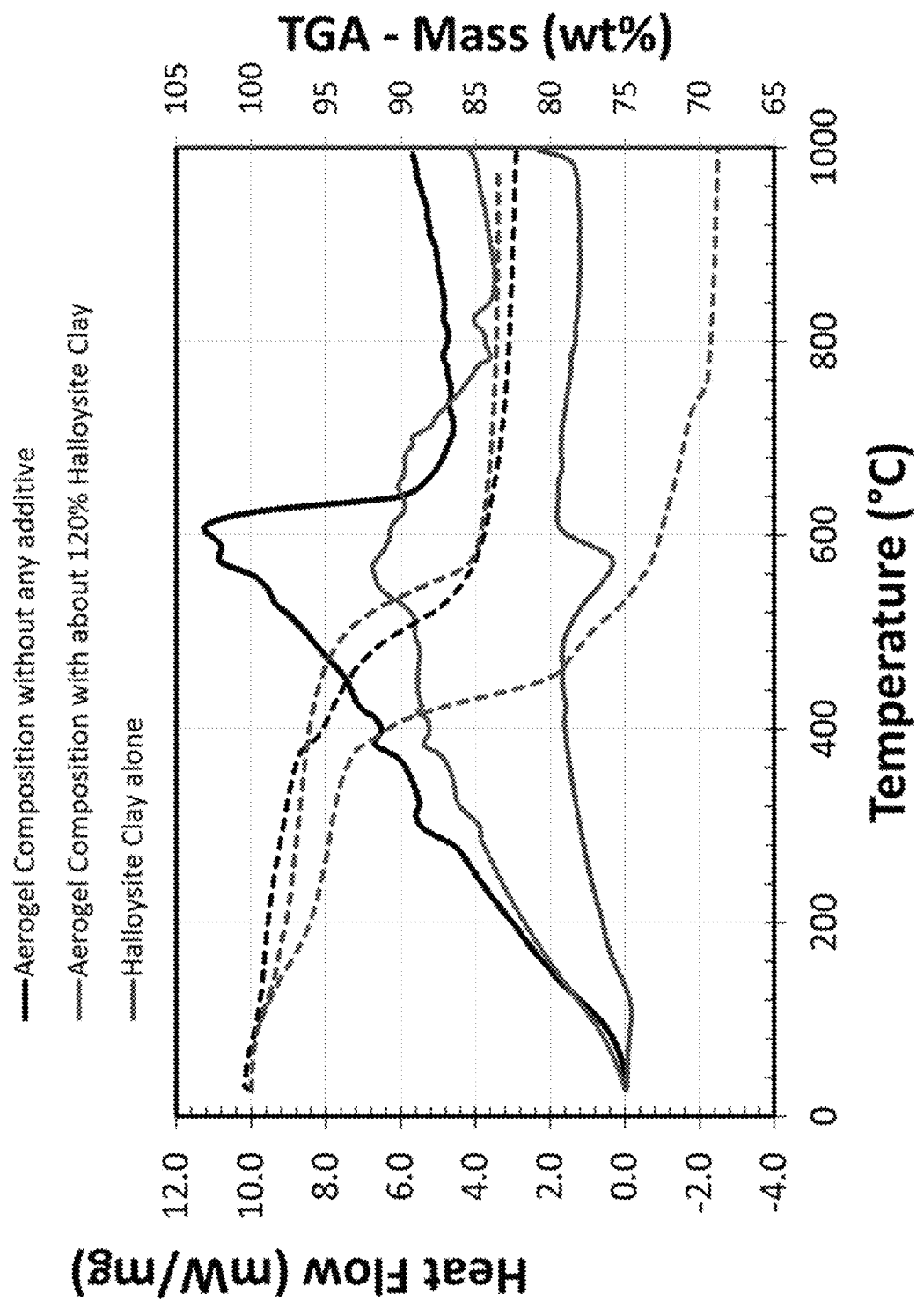
FIG. 2 depicts thermogravimetric analysis (TGA) and differential scanning calorimetry (DSC) measurements for an aerogel composition without any additives, a hydrophobic aerogel composition of the present invention reinforced with melamine foam, with about 120% of halloysite clay, with 100% reference being the weight of silica and hydrophobe constituents of the aerogel composition (Example 21).

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

As used herein, the terms "composition" and "composite" are used interchangeably.

Aerogels are a class of porous materials with open-cells comprising a framework of interconnected structures, with a corresponding network of pores integrated within the framework, and an interstitial phase within the network of pores primarily comprised of gases such as air. Aerogels are typically characterized by a low density, a high porosity, a large surface area, and small pore sizes. Aerogels can be distinguished from other porous materials by their physical and structural properties.

Within the context of the present disclosure, the term "aerogel" or "aerogel material" refers to a gel comprising a framework of interconnected structures, with a corresponding network of interconnected pores integrated within the framework, and containing gases such as air as a dispersed interstitial medium; and which is characterized by the following physical and structural properties (according to Nitrogen Porosimetry Testing) attributable to aerogels: (a) an average pore diameter ranging from about 2 nm to about 100 nm, (b) a porosity of at least 80% or more, and (c) a surface area of about 20 $m^2/g$ or more.

Aerogel materials of the present disclosure thus include any aerogels or other open-celled compounds which satisfy the defining elements set forth in previous paragraphs; including compounds which can be otherwise categorized as xerogels, cryogels, ambigels, microporous materials, and the like.

Aerogel materials may also be further characterized by additional physical properties, including: (d) a pore volume of about 2.0 mL/g or more, particularly about 3.0 mL/g or more; (e) a density of about 0.50 g/cc or less, particularly about 0.25 g/cc or less; and (f) at least 50% of the total pore volume comprising pores having a pore diameter of between 2 and 50 nm; though satisfaction of these additional properties is not required for the characterization of a compound as an aerogel material.

Within the context of the present disclosure, the term "innovative processing and extraction techniques" refers to methods of replacing a liquid interstitial phase in a wet-gel material with a gas such as air, in a manner which causes low pore collapse and low shrinkage to the framework structure of the gel. Drying techniques, such as ambient pressure evaporation, often introduce strong capillary pressures and other mass transfer limitations at the liquid-vapor interface of the interstitial phase being evaporated or removed. The strong capillary forces generated by liquid evaporation or removal can cause significant pore shrinkage and framework collapse within the gel material. The use of innovative processing and extraction techniques during the extraction of a liquid interstitial phase reduces the negative effects of capillary forces on the pores and the framework of a gel during liquid extraction (also referred to as solvent removal or drying).

In certain embodiments, an innovative processing and extraction technique uses near critical or super critical fluids, or near critical or super critical conditions, to extract the liquid interstitial phase from a wet-gel material. This can be accomplished by removing the liquid interstitial phase from the gel near or above the critical point of the liquid or mixture of liquids. Co-solvents and solvent exchanges can be used to optimize the near critical or super critical fluid extraction process.

In certain embodiments, an innovative processing and extraction technique includes the modification of the gel framework to reduce the irreversible effects of capillary pressures and other mass transfer limitations at the liquid-vapor interface. This embodiment can include the treatment of a gel framework with a hydrophobizing agent, or other functionalizing agents, which allow a gel framework to withstand or recover from any collapsing forces during liquid extraction conducted below the critical point of the liquid interstitial phase. This embodiment can also include the incorporation of functional groups or framework elements, which provide a framework modulus that is sufficiently high to withstand or recover from collapsing forces during liquid extraction conducted below the critical point of the liquid interstitial phase.

Within the context of the present disclosure, the terms "framework" or "framework structure" refer to a network of interconnected oligomers, polymers, or particles that form the solid structure of a material. Within the context of the present disclosure, the terms "aerogel framework" or "aerogel framework structure" refer to the network of interconnected oligomers, polymers, or colloidal particles that form the solid structure of a gel or an aerogel. The polymers or particles that make up the aerogel framework structure typically have a diameter of about 100 angstroms. However, framework structures of the present disclosure may also include networks of interconnected oligomers, polymers, or colloidal particles of all diameter sizes that form the solid structure within a material such as a gel or aerogel. Furthermore, the terms "silica-based aerogel" or "silica-based aerogel framework" refer to an aerogel framework in which silica comprises at least 50% (by weight) of the oligomers, polymers, or colloidal particles that form the solid framework structure within in the gel or aerogel.

Within the context of the present disclosure, the term "aerogel composition" refers to any composite material that includes aerogel material as a component of the composite. Examples of aerogel compositions include, but are not limited to fiber-reinforced aerogel composites; aerogel composites which include additive elements such as opacifiers; aerogel composites reinforced by open-cell macroporous frameworks; aerogel-polymer composites; and composite materials which incorporate aerogel particulates, particles, granules, beads, or powders into a solid or semi-solid material, such as binders, resins, cements, foams, polymers, or similar solid materials. Aerogel compositions are generally obtained after the removal of the solvent from various gel materials disclosed in this invention. Aerogel compositions thus obtained may further be subjected to additional processing or treatment. The various gel materials may also be subjected to additional processing or treatment otherwise known or useful in the art before subjected to solvent removal (or liquid extraction or drying).

Within the context of the present disclosure, the term "monolithic" refers to aerogel materials in which a majority (by weight) of the aerogel included in the aerogel material or composition is in the form of a unitary interconnected aerogel nanostructure. Monolithic aerogel materials include aerogel materials which are initially formed to have a unitary interconnected gel or aerogel nanostructure, but which are subsequently cracked, fractured, or segmented into non-unitary aerogel nanostructures. Monolithic aerogel materials are differentiated from particulate aerogel materials. The term "particulate aerogel material" refers to aerogel materials in which a majority (by weight) of the aerogel included in the aerogel material is in the form of particulates, particles, granules, beads, or powders, which can be combined or compressed together but which lack an interconnected aerogel nanostructure between individual particles.

Within the context of the present disclosure, the term "wet gel" refers to a gel in which the mobile interstitial phase within the network of interconnected pores is primarily comprised of a liquid, such as a conventional solvent, liquefied gases like liquid carbon dioxide, or a combination thereof. Aerogels typically require the initial production of a wet gel, followed by innovative processing and extraction to replace the mobile interstitial liquid in the gel with air. Examples of wet gels include, but are not limited to alcogels, hydrogels, ketogels, carbonogels, and any other wet gels known to those in the art.

Aerogel compositions of the present disclosure may comprise reinforced aerogel compositions. Within the context of the present disclosure, the term "reinforced aerogel composition" refers to aerogel compositions comprising a reinforcing phase within the aerogel material, where the reinforcing phase is not part of the aerogel framework itself. The reinforcing phase may be any material that provides increased flexibility, resilience, conformability, or structural stability to the aerogel material. Examples of well-known reinforcing materials include, but are not limited to open-cell macroporous framework reinforcement materials, closed-cell macroporous framework reinforcement materials, open-cell membranes, honeycomb reinforcement materials, polymeric reinforcement materials, and fiber reinforcement materials such as discrete fibers, woven materials, non-woven materials, needled non-wovens, battings, webs, mats, and felts.

Reinforced aerogel compositions of the present disclosure may comprise aerogel compositions reinforced with open-cell macroporous framework materials. Within the context of the present disclosure, the term "open-cell macroporous framework" or "OCMF" refers to a porous material comprising a framework of interconnected structures of substantially uniform composition, with a corresponding network of interconnected pores integrated within the framework; and which is characterized by an average pore diameter ranging from about 10 μm to about 700 μm Such average pore diameter may be measured by known techniques, including but not limited to, Microscopy with optical analysis. OCMF materials of the present disclosure thus include any open-celled materials that satisfy the defining elements set forth in this paragraph, including compounds that can be otherwise categorized as foams, foam-like materials, macroporous materials, and the like. OCMF materials can be differentiated from materials comprising a framework of interconnected structures that have a void volume within the framework and that do not have a uniform composition, such as collections of fibers and binders having a void volume within the fiber matrix.

Within the context of the present disclosure, the term "substantially uniform composition" refers to uniformity in the composition of the referred material within 10% tolerance.

Within the context of the present disclosure, the term "OCMF-reinforced aerogel composition" refers to a reinforced aerogel composition comprising an open-cell macroporous framework material as a reinforcing phase. Suitable OCMF materials for use in the present disclosure include, but are not limited to, OCMF materials made from organic polymeric materials. Examples include OCMF materials made from polyolefins, polyurethanes, phenolics, melamine, cellulose acetate, and polystyrene. Within the context of the present disclosure, the term "organic OCMF" refers to OCMF materials having a framework comprised primarily of organic polymeric materials. OCMF materials made from melamine or melamine derivatives are also preferred in certain embodiments. Within the context of the present disclosure, the terms "melamine OCMF" or "melamine-based OCMF" refer to organic OCMF materials having a framework comprised primarily of polymeric materials derived from reacting melamine with a condensation agent, such as formaldehyde. Examples of OCMF materials made from melamine or melamine derivatives for use in the present disclosure are presented in U.S. Pat. Nos. 8,546,457, 4,666,948, and WO 2001/094436. The term "inorganic OCMF" refers to OCMF materials having a framework comprised primarily of inorganic materials. Examples of inorganic OCMF include, but not limited to, cementous materials, gypsum, and calcium silicate.

Within the context of the present invention, the term "foam" refers to a material comprising a framework of interconnected polymeric structures of substantially uniform composition, with a corresponding network or collection of pores integrated within the framework, and which is formed by dispersing a proportion of gas in the form of bubbles into a liquid or resin foam material such that the gas bubbles are retained as pores as the foam material solidifies into a solid structure. In general, foams can be made using a wide variety of processes—see, for example, U.S. Pat. Nos. 6,147,134; 5,889,071; 6,187,831; and 5,229,429. Foam materials of the present disclosure thus include any materials that satisfy the defining elements set forth in this paragraph, including compounds that can be otherwise categorized as OCMF materials, macroporous materials, and the like. Foams as defined in the present invention may be in the types of thermoplastics, elastomers, and thermosets (duromers).

The pores within a solid framework can also be referred to as "cells". Cells can be divided by cell walls or membranes, creating a collection of independent closed pores within the porous material. The term "closed cell" refers to porous materials in which at least 50% of the pore volume is [substantially] confined cells enclosed by membranes or walls. Cells in a material can also be interconnected through cell openings, creating a network of interconnected open pores within the material. The term "open cell" refers to porous materials in which at least 50% of the pore volume is open cells. The open-cell material may comprise a reticulated open-cell material, a non-reticulated open-cell material, or a combination thereof. Reticulated materials are open cell materials produced through a reticulation process that eliminates or punctures cell membranes within the porous material. Reticulated materials typically have a higher concentration of open cells than non-reticulated materials, but tend to be more expensive and difficult to produce. Generally, no porous material has entirely one type of cell structure (open cell or closed cell). Porous materials may be made using a wide variety of processes, including foam production processes presented in U.S. Pat. Nos. 6,147,134, 5,889,071, 6,187,831, 5,229,429, 4,454,248, and US Patent Application No 20070213417.

Within the context of the present disclosure, the terms "aerogel blanket" or "aerogel blanket composition" refer to aerogel compositions reinforced with a continuous sheet of reinforcement material. Aerogel blanket compositions can be differentiated from other reinforced aerogel compositions that are reinforced with a non-continuous reinforcement material, such as separated agglomerates or clumps of reinforcement materials. Aerogel blanket compositions are particularly useful for applications requiring flexibility, since they are highly conformable and may be used like a blanket to cover surfaces of simple or complex geometry, while also retaining the excellent thermal insulation properties of aerogels.

Within the context of the present disclosure, the terms "flexible" and "flexibility" refer to the ability of an aerogel material or composition to be bent or flexed without macrostructural failure. Aerogel compositions of the present disclosure are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials or compositions capable of bending to at least 90° and/or have a bending radius of less than ½ inch without macroscopic failure. Furthermore, the terms "classified flexible" and "classified as flexible" refer to aerogel materials or compositions which can be classified as flexible according to ASTM C1101 (ASTM International, West Conshohocken, Pa.).

Aerogel compositions of the present disclosure can be flexible, highly flexible, and/or classified flexible. Aerogel compositions of the present disclosure can also be drapable. Within the context of the present disclosure, the terms "drapable" and "drapability" refer to the ability of an aerogel material or composition to be bent or flexed to 90° or more with a radius of curvature of about 4 inches or less, without macroscopic failure. Aerogel materials or compositions according to certain embodiments of the current invention are flexible such that the composition is non-rigid and may be applied and conformed to three-dimensional surfaces or objects, or pre-formed into a variety of shapes and configurations to simplify installation or application.

Within the context of the present disclosure, the terms "additive" or "additive element" refer to materials that may be added to an aerogel composition before, during, or after the production of the aerogel. Additives may be added to alter or improve desirable properties in an aerogel, or to counteract undesirable properties in an aerogel. Additives are typically added to an aerogel material either prior to gelation to precursor liquid, during gelation to a transition state material or after gelation to a solid or semi solid material. Examples of additives include, but are not limited to microfibers, fillers, reinforcing agents, stabilizers, thickeners, elastic compounds, opacifiers, coloring or pigmentation compounds, radiation absorbing compounds, radiation reflecting compounds, fire-class additives, corrosion inhibitors, thermally conductive components, phase change materials, pH adjustors, redox adjustors, HCN mitigators, off-gas mitigators, electrically conductive compounds, electrically dielectric compounds, magnetic compounds, radar blocking components, hardeners, anti-shrinking agents, and other aerogel additives known to those in the art.

Within the context of the present disclosure, the terms "thermal conductivity" and "TC" refer to a measurement of the ability of a material or composition to transfer heat between two surfaces on either side of the material or composition, with a temperature difference between the two surfaces. Thermal conductivity is specifically measured as the heat energy transferred per unit time and per unit surface area, divided by the temperature difference. It is typically recorded in SI units as mW/m*K (milliwatts per meter*Kelvin). The thermal conductivity of a material may be determined by test methods known in the art, including, but not limited to Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Due to different methods possibly resulting in different results, it should be understood that within the context of the present disclosure and unless expressly stated otherwise, thermal conductivity measurements are acquired according to ASTM C518 standard (Test Method for Steady-State Thermal Transmission Properties by Means of the Heat Flow Meter Apparatus), at a temperature of about 37.5° C. at atmospheric pressure in ambient environment, and under a compression load of about 2 psi. The measurements reported as per ASTM C518 typically correlate well with any measurements made as per EN 12667 with any relevant adjustment to the compression load. In certain embodiments, aerogel materials or compositions of the present disclosure have a thermal conductivity of about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Thermal conductivity measurements can also be acquired at a temperature of about 10° C. at atmospheric pressure under compression. Thermal conductivity measurements at 10° C. are generally 0.5-0.7 mW/mK lower than corresponding thermal conductivity measurements at 37.5° C. In certain embodiments, aerogel materials or compositions of the present disclosure have a thermal conductivity at 10° C. of about 40 mW/mK or less, about 30 mW/mK or less, about 25 mW/mK or less, about 20 mW/mK or less, about 18 mW/mK or less, about 16 mW/mK or less, about 14 mW/mK or less, about 12 mW/mK or less, about 10 mW/mK or less, about 5 mW/mK or less, or in a range between any two of these values.

Within the context of the present disclosure, the term "density" refers to a measurement of the mass per unit volume of an aerogel material or composition. The term "density" generally refers to the apparent density of an aerogel material, as well as the bulk density of an aerogel composition. Density is typically recorded as $kg/m^3$ or g/cc. The density of an aerogel material or composition may be determined by methods known in the art, including, but not limited to Standard Test Method for Dimensions and Density of Preformed Block and Board—Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); Determination of the apparent density of preformed pipe insulation (EN 13470, British Standards Institution, United Kingdom); or Determination of the apparent density of preformed pipe insulation (ISO 18098, International Organization for Standardization, Switzerland). Due to different methods possibly resulting in different results, it should be understood that within the context of the present disclosure, density measurements are acquired according to ASTM C167 standard (Standard Test Methods for Thickness and Density of Blanket or Batt Thermal Insulations) at 2 psi compression for thickness measurement, unless otherwise stated. In certain embodiments, aerogel materials or compositions of the present disclosure have a density of about 0.60 g/cc or less, about 0.50 g/cc or less, about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, about 0.05 g/cc or less, about 0.01 g/cc or less, or in a range between any two of these values.

Within the context of the present disclosure, the term "hydrophobicity" refers to a measurement of the ability of an aerogel material or composition to repel water.

Hydrophobicity of an aerogel material or composition may be expressed in terms of the liquid water uptake. Within the context of the present disclosure, the term "liquid water uptake" refers to a measurement of the potential of an aerogel material or composition to absorb or otherwise retain liquid water. Liquid water uptake can be expressed as a percent (by weight or by volume) of water that is absorbed or otherwise retained by an aerogel material or composition when exposed to liquid water under certain measurement conditions. The liquid water uptake of an aerogel material or composition may be determined by methods known in the art, including, but not limited to Standard Test Method for Determining the Water Retention (Repellency) Characteristics of Fibrous Glass Insulation (ASTM C1511, ASTM International, West Conshohocken, Pa.); Standard Test Method for Water Absorption by Immersion of Thermal Insulation Materials (ASTM C1763, ASTM International, West Conshohocken, Pa.); Thermal insulating products for building applications: Determination of short term water absorption by partial immersion (EN 1609, British Standards Institution, United Kingdom). Due to different methods possibly resulting in different results, it should be understood that within the context of the present disclosure, measurements of liquid water uptake are acquired according to ASTM C1511 standard (Standard Test Method for Determining the Water Retention (Repellency) Characteristics of Fibrous Glass Insulation), under ambient pressure and temperature, unless otherwise stated. In certain embodiments, aerogel materials or compositions of the present disclosure can have a liquid water uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition that has improved liquid water uptake relative to another aerogel material or composition will have a lower percentage of liquid water uptake/retention relative to the reference aerogel materials or compositions.

Hydrophobicity of an aerogel material or composition can be expressed in terms of the water vapor uptake. Within the context of the present disclosure, the term "water vapor uptake" refers to a measurement of the potential of an aerogel material or composition to absorb water vapor. Water vapor uptake can be expressed as a percent (by weight) of water that is absorbed or otherwise retained by an aerogel material or composition when exposed to water vapor under certain measurement conditions. The water vapor uptake of an aerogel material or composition may be determined by methods known in the art, including, but not limited to Standard Test Method for Determining the Water Vapor Sorption of Unfaced Mineral Fiber Insulation (ASTM C1104, ASTM International, West Conshohocken, Pa.); Thermal insulating products for building applications: Determination of long term water absorption by diffusion (EN 12088, British Standards Institution, United Kingdom). Due to different methods possibly resulting in different results, it should be understood that within the context of the present disclosure, measurements of water vapor uptake are acquired according to ASTM C1104 standard (Standard Test Method for Determining the Water Vapor Sorption of Unfaced Mineral Fiber Insulation) at 49° C. and 95% humidity for 24 hours (modified from 96 hours according to the ASTM C1104 standard) under ambient pressure, unless otherwise stated. In certain embodiments, aerogel materials or compositions of the present disclosure can have a water vapor uptake of about 50 wt % or less, about 40 wt % or less, about 30 wt % or less, about 20 wt % or less, about 15 wt % or less, about 10 wt % or less, about 8 wt % or less, about 3 wt % or less, about 2 wt % or less, about 1 wt % or less, about 0.1 wt % or less, or in a range between any two of these values. An aerogel material or composition that has improved water vapor uptake relative to another aerogel material or composition will have a lower percentage of water vapor uptake/retention relative to the reference aerogel materials or compositions.

Hydrophobicity of an aerogel material or composition can be expressed by measuring the equilibrium contact angle of a water droplet at the interface with the surface of the material. Aerogel materials or compositions of the present disclosure can have a water contact angle of about 90° or more, about 120° or more, about 130° or more, about 140° or more, about 150° or more, about 160° or more, about 170° or more, about 175° or more, or in a range between any two of these values.

Within the context of the present disclosure, the terms "heat of combustion", "HOC" and "$\Delta H_C$" refer to a measurement of the amount of heat energy released in the combustion or exothermic thermal decomposition of a material or composition. Heat of combustion is typically recorded in calories of heat energy released per gram of aerogel material or composition (cal/g), or as megajoules of heat energy released per kilogram of material or composition (MJ/kg). The heat of combustion of a material or composition may be determined by methods known in the art, including, but not limited to Reaction to fire tests for products—Determination of the gross heat of combustion (calorific value) (EN ISO 1716, International Organization for Standardization, Switzerland; EN adopted). Within the context of the present disclosure, heat of combustion measurements are acquired according to EN ISO 1716 standards (Reaction to fire tests for products—Determination of the gross heat of combustion (calorific value)), unless otherwise stated. In certain embodiments, aerogel compositions of the present disclosure may have a heat of combustion of about 750 cal/g or less, about 717 cal/g or less, about 700 cal/g or less, about 650 cal/g or less, about 600 cal/g or less, about 575 cal/g or less, about 550 cal/g or less, about 500 cal/g or less, about 450 cal/g or less, about 400 cal/g or less, about 350 cal/g or less, about 300 cal/g or less, about 250 cal/g or less, about 200 cal/g or less, about 150 cal/g or less, about 100 cal/g or less, about 50 cal/g or less, about 25 cal/g or less, about 10 cal/g or less, or in a range between any two of these values. An aerogel composition that has an improved heat of combustion relative to another aerogel composition will have a lower heat of combustion value, relative to the reference aerogel compositions. In certain embodiments of the present disclosure, the HOC of an aerogel composite is improved by incorporating a fire-class additive into the aerogel composite.

Within the context of the present disclosure, all thermal analyses and related definitions are referenced with measurements performed by starting at 25° C. and ramping at a rate of 20° C. per minute up to 1000° C. in air at ambient pressure. Accordingly, any changes in these parameters will have to be accounted for (or re-performed under these conditions) in measuring and calculating onset of thermal decomposition, temperature of peak heat release, temperature of peak hear absorption and the like. Within the context of the present disclosure, the terms "onset of thermal decomposition" and "$T_D$" refer to a measurement of the lowest temperature of environmental heat at which rapid exothermic reactions from the decomposition of organic material appear within a material or composition. The onset of thermal decomposition of organic material within a material or composition may be measured using thermo-gravimetric analysis (TGA). The TGA curve of a material depicts the weight loss (% mass) of a material as it is exposed to an increase in surrounding temperature, thus indicating thermal decomposition. The onset of thermal decomposition of a material can be correlated with the intersection point of the following tangent lines of the TGA curve: a line tangent to the base line of the TGA curve, and a line tangent to the TGA curve at the point of maximum slope during the rapid exothermic decomposition event related to the decomposition of organic material. Within the context of the present disclosure, measurements of the onset of thermal decomposition of organic material are acquired using TGA analysis as provided in this paragraph, unless otherwise stated.

The onset of thermal decomposition of a material may also be measured using differential scanning calorimetry (DSC) analysis. The DSC curve of a material depicts the heat energy (mW/mg) released by a material as it is exposed to a gradual increase in surrounding temperature. The onset of thermal decomposition temperature of a material can be correlated with the point in the DSC curve where the Δ mW/mg (change in the heat energy output) maximally increases, thus indicating exothermic heat production from the aerogel material. Within the context of the present disclosure, measurements of onset of thermal decomposition using DSC, TGA, or both are acquired using a temperature ramp rate of 20° C./min as further defined in the previous paragraph, unless otherwise stated expressly. DSC and TGA each provide similar values for this onset of thermal decomposition, and many times, the tests are run concurrently, so that results are obtained from both. In certain embodiments, aerogel materials or compositions of the present disclosure have an onset of thermal decomposition of about 300° C. or more, about 320° C. or more, about 340° C. or more, about 360° C. or more, about 380° C. or more, about 400° C. or more, about 420° C. or more, about 440° C. or more, about 460° C. or more, about 480° C. or more, about 500° C. or more, about 550° C. or more, about 600° C. or more, or in a range between any two of these values. Within the context herein, for example, a first composition having an onset of thermal decomposition that is higher than an onset of thermal decomposition of a second composition, would be considered an improvement of the first composition over the second composition. It is contemplated herein that onset of thermal decomposition of a composition or material is increased when adding one or more fire-class additives, as compared to a composition that does not include any fire-class additives.

Within the context of the present disclosure, the terms "onset of endothermic decomposition" and "TED" refer to a measurement of the lowest temperature of environmental heat at which endothermic reactions from decomposition or dehydration appear within a material or composition. The onset of endothermic decomposition of a material or composition may be measured using thermo-gravimetric analysis (TGA). The TGA curve of a material depicts the weight loss (% mass) of a material as it is exposed to an increase in surrounding temperature. The onset of thermal decomposition of a material may be correlated with the intersection point of the following tangent lines of the TGA curve: a line tangent to the base line of the TGA curve, and a line tangent to the TGA curve at the point of maximum slope during the rapid endothermic decomposition or dehydration of the material. Within the context of the present disclosure, measurements of the onset of endothermic decomposition of a material or composition are acquired using TGA analysis as provided in this paragraph, unless otherwise stated.

Within the context of the present disclosure, the terms "furnace temperature rise" and "$\Delta T_R$" refer to a measurement of the difference between a maximum temperature ($T_{MAX}$) of a material or composition under thermal decomposition conditions relative to a baseline temperature of that material or composition under the thermal decomposition conditions (usually the final temperature, or $T_{FIN}$). Furnace temperature rise is typically recorded in degrees Celsius, or ° C. The furnace temperature rise of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, furnace temperature rise measurements are acquired according to conditions comparable to EN ISO 1182 standard (Reaction to fire tests for building and transport products: Non-combustibility test), unless otherwise stated. In certain embodiments, aerogel compositions of the present disclosure can have a furnace temperature rise of about 100° C. or less, about 90° C. or less, about 80° C. or less, about 70° C. or less, about 60° C. or less, about 50° C. or less, about 45° C. or less, about 40° C. or less, about 38° C. or less, about 36° C. or less, about 34° C. or less, about 32° C. or less, about 30° C. or less, about 28° C. or less, about 26° C. or less, about 24° C. or less, or in a range between any two of these values. Within the context of compositional stability at elevated temperatures, for example, a first composition having a furnace temperature rise that is lower than a furnace temperature rise of a second composition, would be considered an improvement of the first composition over the second composition. It is contemplated herein that furnace temperature rise of a composition is reduced when adding one or more fire-class additives, as compared to a composition that does not include any fire-class additives.

Within the context of the present disclosure, the terms "flame time" and "$T_{FLAME}$" refer to a measurement of sustained flaming of a material or composition under thermal decomposition conditions, where "sustained flaming" is a persistence of flame at any part on the visible part of the specimen lasting 5 seconds or longer. Flame time is typically recorded in seconds or minutes. The flame time of a material or composition may be determined by methods known in the art, including, but not limited to Reaction to fire tests for building and transport products: Non-combustibility test (EN ISO 1182, International Organization for Standardization, Switzerland; EN adopted). Within the context of the present disclosure, flame time measurements are acquired according to conditions comparable to EN ISO 1182 standard (Reaction to fire tests for building and transport products: Non-combustibility test), unless otherwise stated. In certain embodiments, aerogel compositions of the present disclosure have a flame time of about 30 seconds or less, about 25 seconds or less, about 20 seconds or less, about 15 seconds or less, about 10 seconds or less, about 5 seconds or less, about 2 seconds or less, or in a range between any two of these values. Within the context herein, for example, a first composition having a flame time that is lower than a flame time of a second composition, would be considered an improvement of the first composition over the second composition. It is contemplated herein that flame time of a composition is reduced when adding one or more fire-class additives, as compared to a composition that does not include any fire-class additives.

Within the context of the present disclosure, the terms "mass loss" and "ΔM" refer to a measurement of the amount of a material, composition, or composite that is lost or burned off under thermal decomposition conditions. Mass loss is typically recorded as weight percent or wt %. The mass loss of a material, composition, or composite may be determined by methods known in the art, including, but not limited to: Reaction to fire tests for building and transport products: Non-combustibility test (EN ISO 1182, International Organization for Standardization, Switzerland; EN adopted). Within the context of the present disclosure, mass loss measurements are acquired according to conditions comparable to EN ISO 1182 standard (Reaction to fire tests for building and transport products: Non-combustibility test), unless otherwise stated. In certain embodiments, aerogel compositions of the present disclosure can have a mass loss of about 50% or less, about 40% or less, about 30% or less, about 28% or less, about 26% or less, about 24% or less, about 22% or less, about 20% or less, about 18% or less, about 16% or less, or in a range between any two of these values. Within the context herein, for example, a first composition having a mass loss that is lower than a mass loss of a second composition would be considered an improvement of the first composition over the second composition. It is contemplated herein that mass loss of a composition is reduced when adding one or more fire-class additives, as compared to a composition that does not include any fire-class additives.

Within the context of the present disclosure, the terms "temperature of peak heat release" refers to a measurement of the temperature of environmental heat at which exothermic heat release from decomposition is at the maximum. The temperature of peak heat release of a material or composition may be measured using TGA analysis, differential scanning calorimetry (DSC) or a combination thereof. DSC and TGA each would provide similar values for temperature of peak heat release, and many times, the tests are run concurrently, so that results are obtained from both. In a typical DSC analysis, heat flow is plotted against the rising temperature and temperature of peak heat release is the temperature at which the highest peak in such curve occurs. Within the context of the present disclosure, measurements of the temperature of peak heat release of a material or composition are acquired using TGA analysis as provided in this paragraph, unless otherwise stated.

In the context of an endothermic material, the terms "temperature of peak heat absorption" refers to a measurement of the temperature of environmental heat at which endothermic heat absorption from decomposition is at the minimum. The temperature of peak heat absorption of a material or composition may be measured using TGA analysis, differential scanning calorimetry (DSC) or a combination thereof. In a typical DSC analysis, heat flow is plotted against the rising temperature and temperature of peak heat absorption is the temperature at which the lowest peak in such curve occurs. Within the context of the present disclosure, measurements of the temperature of peak heat absorption of a material or composition are acquired using TGA analysis as provided in this paragraph, unless otherwise stated.

Within the context of the present disclosure, the term "low-flammability" and "low-flammable" refer to a material or composition which satisfy the following combination of properties: i) a furnace temperature rise of 50° C. or less; ii) a flame time of 20 seconds or less; and iii) a mass loss of 50 wt % or less. Within the context of the present disclosure, the term "non-flammability" and "non-flammable" refer to a material or composition which satisfy the following combination of properties: i) a furnace temperature rise of 40° C. or less; ii) a flame time of 2 seconds or less; and iii) a mass loss of 30 wt % or less. It is contemplated that flammability (e.g., combination of furnace temperature rise, flame time, and mass loss) of a composition is reduced upon inclusion of one or more fire-class additives, as described herein.

Within the context of the present disclosure, the term "low-combustibility" and "low-combustible" refer to a low-flammable material or composition which has a total heat of combustion (HOC) less than or equal to 3 MJ/kg. Within the context of the present disclosure, the term "non-combustibility" and "non-combustible" refer to a non-flammable material or composition which has the heat of combustion (HOC) less than or equal to 2 MJ/kg. It is contemplated that HOC of a composition is reduced upon inclusion of one or more fire-class additives, as described herein.

Aerogels are described as a framework of interconnected structures that are most commonly comprised of interconnected oligomers, polymers, or colloidal particles. An aerogel framework may be made from a range of precursor materials, including inorganic precursor materials (such as precursors used in producing silica-based aerogels); organic precursor materials (such precursors used in producing carbon-based aerogels); hybrid inorganic/organic precursor materials; and combinations thereof. Within the context of the present disclosure, the term "amalgam aerogel" refers to an aerogel produced from a combination of two or more different gel precursors; the corresponding precursors are referred to as "amalgam precursors".

Inorganic aerogels are generally formed from metal oxide or metal alkoxide materials. The metal oxide or metal alkoxide materials may be based on oxides or alkoxides of any metal that can form oxides. Such metals include, but are not limited to silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to metal silicates such as sodium silicate or potassium silicate, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethyl silicates, partially hydrolyzed polyethysilicates, monomeric alkylalkoxy silanes, bis-trialkoxy alkyl or aryl silanes, polyhedral silsesquioxanes, or combinations thereof.

In certain embodiments of the present disclosure, pre-hydrolyzed TEOS, such as Silbond H-5 (SBH5, Silbond Corp), which is hydrolyzed with a water/silica ratio of about 1.9-2, may be used as commercially available or may be further hydrolyzed prior to incorporation into the gelling process. Partially hydrolyzed TEOS or TMOS, such as polyethysilicate (Silbond 40) or polymethylsilicate may also be used as commercially available or may be further hydrolyzed prior to incorporation into the gelling process.

Inorganic aerogels can also include gel precursors comprising at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors may be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to trimethyl methoxysilane (TMS), dimethyl dimethoxysilane (DMS), methyl trimethoxysilane (MTMS), trimethyl ethoxysilane, dimethyl diethoxysilane (DMDS), methyl triethoxysilane (MTES), ethyl triethoxysilane (ETES), diethyl diethoxysilane, ethyl triethoxysilane, propyl trimethoxysilane, propyl triethoxysilane, phenyl trimethoxysilane, phenyl triethoxysilane (PhTES), hexamethyldisilazane and hexaethyldisilazane, and the like. Any derivatives of any of the above precursors may be used and specifically certain polymeric of other chemical groups may be added or cross-linked to one or more of the above precursors.

Aerogels may also be treated to impart or improve hydrophobicity. Hydrophobic treatment can be applied to a sol-gel solution, a wet-gel prior to liquid extraction, or to an aerogel subsequent to liquid extraction. Hydrophobic treatment is especially common in the production of metal oxide aerogels, such as silica aerogels. An example of a hydrophobic treatment of a gel is discussed below in greater detail, specifically in the context of treating a silica wet-gel. However, the specific examples and illustrations provided herein are not intended to limit the scope of the present disclosure to any specific type of hydrophobic treatment procedure or aerogel substrate. The present disclosure can include any gel or aerogel known to those in the art, as well as associated methods of hydrophobic treatment of the aerogels, in either wet-gel form or dried aerogel form.

Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound can react with hydroxyl groups on the gel according the following reaction: $R_NMX_{4-N}$ (hydrophobizing agent)+MOH (silanol)→$MOMR_N$ (hydrophobic group)+HX. Hydrophobic treatment can take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents can be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $R_NMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to trimethylchlorosilane (TMCS), triethylchlorosilane (TEC S), triphenylchlorosilane (TPCS), dimethylchlorosilane (DMCS), dimethyldichlorosilane (DMDCS), and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieites. Specific examples of such hydrophobizing agents include, but are not limited to hexamethyldisilazane [HMDZ] and hexamethyldisiloxane [HMDSO]. Hydrophobizing agents can further include compounds of the formula: $R_NMV_{4-N}$, wherein V is a reactive or leaving group other than a halogen. Specific examples of such hydrophobizing agents include, but are not limited to vinyltriethoxysilane and vinyltrimethoxysilane.

Hydrophobic treatments of the present invention may also be performed during the removal, exchange or drying of liquid in the gel. In a specific embodiment, the hydrophobic treatment may be performed in supercritical fluid environment (such as, but not limited to supercritical carbon dioxide) and may be combined with the drying or extraction step.

Within the context of the present disclosure, the term "hydrophobic-bound silicon" refers to a silicon atom within the framework of a gel or aerogel comprising at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDS). Hydrophobic-bound silicon may also include, but are not limited to, silicon atoms in the gel framework or on the surface of the gel which are treated with a hydrophobizing agent (such as HMDZ) to impart or improve hydrophobicity by incorporating additional hydrophobic groups into the composition. Hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material, which are the product of reactions between organic solvents and silanol groups. Such excluded groups are distinguishable from hydrophobic organic content of this through NMR analysis. The amount of hydrophobic-bound silicon contained in an aerogel can be analyzed using NMR spectroscopy, such as CP/MAS $^{29}$Si Solid State NMR. An NMR analysis of an aerogel allows for the characterization and relative quantification of M-type hydrophobic-bound silicon (monofunctional silica, such as TMS derivatives); D-type hydrophobic-bound silicon (bifunctional silica, such as DMDS derivatives); T-type hydrophobic-bound silicon (trifunctional silica, such as MTES derivatives); and Q-type silicon (quadfunctional silica, such as TEOS derivatives). NMR analysis can also be used to analyze the bonding chemistry of hydrophobic-bound silicon contained in an aerogel by allowing for categorization of specific types of hydrophobic-bound silicon into sub-types (such as the categorization of T-type hydrophobic-bound silicon into $T^1$ species, $T^2$ species, and $T^3$ species). Specific details related to the NMR analysis of silica materials can be found in the article "Applications of Solid-State NMR to the Study of Organic/Inorganic Multicomponent Materials" by Geppi et al., specifically pages 7-9 (Appl. Spec. Rev. (2008), 44-1: 1-89), which is hereby incorporated by reference according to the specifically cited pages.

The characterization of hydrophobic-bound silicon in a CP/MAS $^{29}$Si NMR analysis can be based on the following chemical shift peaks: $M^1$ (30 to 10 ppm); $D^1$ (10 to –10 ppm), $D^2$ (–10 to –20 ppm); $T^1$ (–30 to –40 ppm), $T^2$ (–40 to –50 ppm), $T^3$ (–50 to –70 ppm); $Q^2$ (–70 to –85 ppm), $Q^3$ (–85 to –95 ppm), $Q^4$ (–95 to –110 ppm). These chemical shift peaks are approximate and exemplary, and are not intended to be limiting or definitive. The precise chemical shift peaks attributable to the various silicon species within a material can depend on the specific chemical components of the material, and can generally be deciphered through routine experimentation and analysis by those in the art.

Within the context of the present disclosure, the term "hydrophobic organic content" or "hydrophobe content" or "hydrophobic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) of the subject materials, preferably in oxygen atmosphere (though TGA under alternate gas environments are also useful). Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis. Other alternative techniques such as differential scanning calorimetry, elemental analysis (particularly, carbon), chromatographic techniques, nuclear magnetic resonance spectra and other analytical techniques known to person of skilled in the art may be used to measure and determine hydrophobe content in the aerogel compositions of the present invention. In certain instances, a combination of the known techniques may be useful or necessary in determining the hydrophobe content of the aerogel compositions of the present invention.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The term "fuel content" refers to the total amount of combustible material in an aerogel material or composition, which can be correlated with the total percentage of weight loss in an aerogel material or composition when subjected to combustive heat temperatures during a TGA or TG-DSC analysis, with adjustments being made for the loss of moisture. The fuel content of an aerogel material or composition can include hydrophobic organic content, as well as other combustible residual alcoholic solvents, filler materials, reinforcing materials, and readily hydrolysable alkoxy groups.

Organic aerogels are generally formed from carbon-based polymeric precursors. Such polymeric materials include, but are not limited to resorcinol formaldehydes (RF), polyimide, polyacrylate, polymethyl methacrylate, acrylate oligomers, polyoxyalkylene, polyurethane, polyphenol, polybutadiene, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of (organically modified silica ("ormosil") aerogels. These ormosil materials include organic components that are covalently bonded to a silica network. Ormosils are typically formed through the hydrolysis and condensation of organically modified silanes, R—Si(OX)$_3$, with traditional alkoxide precursors, Y(OX)$_4$. In these formulas, X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present disclosure, the term "ormosil" encompasses the foregoing materials as well as other organically modified materials, sometimes referred to as "ormocers." Ormosils are often used as coatings where an ormosil film is cast over a substrate material through, for example, the sol-gel process. Examples of other organic-inorganic hybrid aerogels of the disclosure include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

In certain embodiments, aerogels of the present disclosure are inorganic silica aerogels formed primarily from prepolymerized silica precursors preferably as oligomers, or hydrolyzed silicate esters formed from silicon alkoxides in an alcohol solvent. In certain embodiments, such prepolymerized silica precursors or hydrolyzed silicate esters may be formed in situ from other precurosrs or silicate esters such as alkoxy silanes or water glass. However, the disclosure as a whole may be practiced with any other aerogel compositions known to those in the art, and is not limited to any one precursor material or amalgam mixture of precursor materials.

Production of an aerogel generally includes the following steps: i) formation of a sol-gel solution; ii) formation of a gel from the sol-gel solution; and iii) extracting the solvent from the gel materials through innovative processing and extraction, to obtain a dried aerogel material. This process is discussed below in greater detail, specifically in the context of forming inorganic aerogels such as silica aerogels. However, the specific examples and illustrations provided herein are not intended to limit the present disclosure to any specific type of aerogel and/or method of preparation. The present disclosure can include any aerogel formed by any associated method of preparation known to those in the art, unless otherwise noted.

The first step in forming an inorganic aerogel is generally the formation of a sol-gel solution through hydrolysis and condensation of silica precursors, such as, but not limited to, metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, particularly 2 to 4, although other solvents can be used as known to those with skill in the art. Examples of useful solvents include, but are not limited to methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers, and additives being incorporated into the sol-gel solution; as well as the target processing conditions for gelling and liquid extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example): $Si(OC_2H_5)_4 + 4H_2O \rightarrow Si(OH)_4 + 4(C_2H_5OH)$. The resulting hydrolyzed metal hydroxide precursors remain suspended in the solvent solution in a "sol" state, either as individual molecules or as small polymerized (or oligomarized) colloidal clusters of molecules. For example, polymerization/condensation of the $Si(OH)_4$ precursors can occur as follows: $2\ Si(OH)_4 = (OH)_3Si-O-Si(OH)_3 + H_2O$. This polymerization can continue until colloidal clusters of polymerized (or oligomarized) $SiO_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, exemplary acids include HCl, $H_2SO_4$, $H_3PO_4$, oxalic acid and acetic acid. Any base may likewise be used to catalyze precursor reactions and to obtain a higher pH solution, with an exemplary base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. In certain embodiments, the sol-gel solution comprising the gelling precursors, solvents, catalysts, water, filler materials, and other additives is a homogenous solution that is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques is known to those in the art. Examples include, but are not limited to maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components (gel precursors) into a gel material may also include an aging step (also referred to as curing) prior to liquid extraction or removal of the solvent from the gel (also referred to as drying of the gel). Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during liquid extraction. Aging can involve maintaining the gel (prior to extraction) at a quiescent state for an extended period, maintaining the gel at elevated temperatures, adding cross-linkage promoting compounds, or any combination thereof. Preferred temperatures for aging are typically between about 10° C. and about 100° C., though other suitable temperatures are contemplated herein as well. The aging of a gel material typically continues up to the liquid extraction of the wet-gel material.

The time period for transitioning gel-forming materials (gel precursors) into a gel material includes both the duration of the initial gel formation (from initiation of gelation up to the gel point), as well as the duration of any subsequent curing and aging of the gel material prior to liquid extraction or removal of the solvent from the gel (also referred to as drying of the gel) (from the gel point up to the initiation of liquidextraction/removal of solvent). The total time period for transitioning gel-forming materials into a gel material is typically between about 1 minute and several days, typically about 30 hours or less, about 24 hours or less, about 15 hours or less, about 10 hours or less, about 6 hours or less, about 4 hours or less, about 2 hours or less, and preferably, about 1 hour or less, about 30 minutes or less, about 15 minutes or less, or about 10 minutes or less.

In another embodiment, the resulting gel material may be washed in a suitable secondary solvent to replace the primary reaction solvent present in the wet-gel. Such secondary solvents may be linear monohydric alcohols with one or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative. In another embodiment, the resulting gel material may be washed in additional quantities of the same solvent present within the gel material, which among others, may remove any undesired by-products or other precipitates in the gel material.

Once a gel material has been formed and processed, the liquid of the gel can then be at least partially extracted from the wet-gel using extraction methods, including innovative processing and extraction techniques, to form an aerogel material. Liquid extraction, among other factors, plays an important role in engineering the characteristics of aerogels, such as porosity and density, as well as related properties such as thermal conductivity. Generally, aerogels are obtained when a liquid is extracted from a gel in a manner that causes low shrinkage to the porous network and framework of the wet gel. This liquid extraction may also be referred to as solvent removal or drying among others.

One example of an alternative method of forming a silica aerogel uses metal oxide salts such as sodium silicate, also known as water glass. A water glass solution is first produced by mixing sodium silicate with water and an acid to form a silicic acid precursor solution. Salt by-products may be removed from the silicic acid precursor by ion exchange, surfactant separation, membrane filtration, or other chemical or physical separation techniques. The resulting sol can then be gelled, such as by the addition of a base catalyst, to produce a hydrogel. The hydrogel can be washed to remove any residual salts or reactants. Removing the water from the pores of the gel can then be performed via exchange with a polar organic solvent such as ethanol, methanol, or acetone. The liquid in the gel is then at least partially extracted using innovative processing and extraction techniques. In an embodiment, Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs well below the critical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogel materials or compositions with sufficiently low shrinkage, thus producing a commercially viable end-product.

Several additional aerogel extraction techniques are known in the art, including a range of different approaches in the use of supercritical fluids in drying aerogels. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and extracting the fluid/sol-gel using a supercritical fluid such as supercritical carbon dioxide, supercritical ethanol, or supercritical hexane. U.S. Pat. No. 6,315,971 discloses a process for producing gel compositions comprising drying a wet gel comprising gel solids and a drying agent to remove the drying agent under drying conditions sufficient to reduce shrinkage of the gel during drying. U.S. Pat. No. 5,420,168 describes a process whereby Resorcinol/Formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid from aerogel materials can be found in U.S. Pat. Nos. 5,275,796 and 5,395,805.

One embodiment of extracting a liquid from the wet-gel uses supercritical fluids such as carbon dioxide, including, for example first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the liquid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

Another example of an alternative method of forming aerogels includes reducing the damaging capillary pressure forces at the solvent/pore interface by chemical modification of the matrix materials in their wet gel state via conversion of surface hydroxyl groups to hydrophobic trimethylsilylethers, thereby allowing for liquid extraction from the gel materials at temperatures and pressures below the critical point of the solvent.

In yet another embodiment, liquid (solvent) in the gel material may be frozen at lower temperatures followed by a sublimation process whereby the solvent is removed from the gel material. Such removal or drying of the solvent from the gel material is understood to be within the scope of this disclosure. Such removal largely preserves the gel structure, thus producing an aerogel with unique properties.

Large-scale production of aerogel materials or compositions can be complicated by difficulties related to the continuous formation of gel materials on a large scale; as well as the difficulties related to liquid extraction from gel materials in large volumes using innovative processing and extraction techniques. In certain embodiments, aerogel materials or compositions of the present disclosure are accommodating to production on a large scale. In certain embodiments, gel materials of the present disclosure can be produced in large scale through a continuous casting and gelation process. In certain embodiments, aerogel materials or compositions of the present disclosure are produced in a large scale, requiring the use of large-scale extraction vessels. Large scale extraction vessels of the present disclosure can include extraction vessels which have a volume of about 0.1 $m^3$ or more, about 0.25 $m^3$ or more, about 0.5 $m^3$ or more, or about 0.75 $m^3$ or more.

Aerogel compositions of the present disclosure can have a thickness of 15 mm or less, 10 mm or less, 5 mm or less, 3 mm or less, 2 mm or less, or 1 mm or less.

Aerogel compositions may be reinforced with various reinforcement materials to achieve a more flexible, resilient and conformable composite product. The reinforcement materials can be added to the gels at any point in the gelling process to produce a wet, reinforced gel composition. The wet gel composition may then be dried to produce a reinforced aerogel composition.

Aerogel compositions may be OCMF-reinforced with various open-celled macroporous framework reinforcement materials to achieve a more flexible, resilient and conformable composite product. The OCMF reinforcement materials can be added to the gels at any point in the gelling process before gelation to produce a wet, reinforced gel composition. The wet gel composition may then be dried to produce an OCMF-reinforced aerogel composition. OCMF reinforcement materials can be formed from organic polymeric materials such as melamine or melamine derivatives, and are present in the form of a continuous sheet or panel.

Melamine OCMF materials can be produced from melamine-formaldehyde precondensation solution. An aqueous solution of a melamine-formaldehyde condensation product is produced by combining a melamine-formaldehyde precondensate with a solvent, an emulsifier/dispersant, a curing agent such as an acid, and a blowing agent such as a C5 to C7 hydrocarbon. The melamine-formaldehyde solution or resin is then cured at elevated temperature above the boiling point of the blowing agent to produce an OCMF comprising a multiplicity of interconnected, three-dimensionally branched melamine structures, with a corresponding network of interconnected pores integrated within the framework. The melamine-formaldehyde precondensates generally have a molar ratio of formaldehyde to melamine in the range from 5:1 to 1.3:1 and typically in the range from 3.5:1 to 1.5:1. The precondensates can be in the form of a powder, a spray, a resin, or a solution. The solvent included in the melamine-formaldehyde precondensation solution can comprise alcohols such as methanol, ethanol, or butanol.

The emulsifier/dispersant included in the melamine-formaldehyde precondensation solution can comprise an anionic surfactant, a cationic emulsifier, or a nonionic surfactant. Useful anionic surfactants include, but are not limited to diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfo fatty acid esters, acylaminoalkanesulfonates, acyl isethionates, alkyl ether carboxylates, N-acylsarcosinates, alkyl, and alkylether phosphates. Useful cationic emulsifiers include, but are not limited to alkyltriammonium salts, alkylbenzyl dimethylammonium salts, or alkylpyridinium salts. Useful nonionic surfactants include, but are not limited to alkylphenol polyglycol ethers, fatty alcohol polyglycol ethers, fatty acid polyglycol ethers, fatty acid alkanolamides, ethylene oxide-propylene oxide block copolymers, amine oxides, glycerol fatty acid esters, sorbitan esters, and alkylpolyglycosides. The emulsifier/dispersant can be added in amounts from 0.2% to 5% by weight, based on the melamine-formaldehyde precondensate.

The curing agent included in the melamine-formaldehyde precondensation solution can comprise acidic compounds. The amount of these curatives is generally in the range from 0.01% to 20% by weight and typically in the range from 0.05% to 5% by weight, all based on the melamine-formaldehyde precondensate. Useful acidic compounds include, but are not limited to organic and inorganic acids, for example selected from the group consisting of hydrochloric acid, sulfuric acid, phosphoric acid, nitric acid, formic acid, acetic acid, oxalic acid, toluenesulfonic acids, amidosulfonic acids, acid anhydrides, and mixtures thereof.

The blowing agent included in the melamine-formaldehyde precondensation solution can comprise physical blowing agents or chemical blowing agents. Useful physical blowing agents include, but are not limited to hydrocarbons, such as pentane and hexane; halogenated hydrocarbons, more particularly chlorinated and/or fluorinated hydrocarbons, for example methylene chloride, chloroform, trichloroethane, chlorofluorocarbons, and hydro-chlorofluorocarbons (HCFCs); alcohols, for example methanol, ethanol, n-propanol or isopropanol; ethers, ketones and esters, for example methyl formate, ethyl formate, methyl acetate or ethyl acetate; and gases, such as air, nitrogen or carbon dioxide. In certain embodiments, it is preferable to add a physical blowing agent having a boiling point between 0° C. and 80° C. Useful chemical blowing agents include, but are not limited to, isocyanates mixed with water (releasing carbon dioxide as active blowing agent); carbonates and/or bicarbonates mixed with acids (releasing carbon dioxide as active blowing agent); and azo compounds, for example azodicarbonamide. The blowing agent is present in the melamine-formaldehyde precondensation solution in an amount of 0.5% to 60% by weight, particularly 1% to 40% by weight and in certain embodiments 1.5% to 30% by weight, based on the melamine-formaldehyde precondensate.

The melamine-formaldehyde precondensation solution can be formed into a melamine OCMF material by heating the solution to a temperature generally above the boiling point of the blowing agent used, thereby forming an OCMF comprising a multiplicity of interconnected, three-dimensionally branched melamine structures, with a corresponding network of interconnected open-cell pores integrated within the framework. The introduction of heat energy may be effected via electromagnetic radiation, for example via high-frequency radiation at 5 to 400 kW, for example 5 to 200 kW and in certain embodiments 9 to 120 kW per kilogram of the mixture used in a frequency range from 0.2 to 100 GHz, or more specifically 0.5 to 10 GHz. Magnetrons are a useful source of dielectric radiation, and one magnetron can be used or two or more magnetrons at the same time.

The OCMF material can be dried to remove residual liquids (water, solvent, blowing agent) from the OCMF material. An after-treatment can also be utilized to hydrophobicize the OCMF material. This after-treatment can employ hydrophobic coating agents having high thermal stability and/or low flammability, for example silicones, siliconates or fluorinated compounds.

The density of the melamine OCMF is generally in the range from 0.005 to 0.3 g/cc, for example in the range from 0.01 to 0.2 g/cc, in certain embodiments in the range from 0.03 to 0.15 g/cc, or most specifically in the range from 0.05 to 0.15 g/cc. The average pore diameter of the melamine OCMF is generally in the range of 10 µm to about 1000 µm, particularly in the range from 50 to 700 µm.

In an embodiment, OCMF reinforcement materials are incorporated into the aerogel composition as continuous sheet. The process comprises initially producing a continuous sheet of OCMF-reinforced gel by casting or impregnating a gel precursor solution into a continuous sheet of OCMF reinforcement material, and allowing the material to form into a reinforced gel composite sheet. The liquid may then be at least partially extracted from the OCMF-reinforced gel composite sheet to produce a sheet-like, OCMF-reinforced aerogel composition.

Aerogel compositions can include an opacifier to reduce the radiative component of heat transfer. At any point prior to gel formation, opacifying compounds or precursors thereof may be dispersed into the mixture comprising gel precursors. Examples of opacifying compounds include, but are not limited to Boron Carbide ($B_4C$), Diatomite, Manganese ferrite, MnO, NiO, SnO, $Ag_2O$, $Bi_2O_3$, carbon black, titanium oxide, iron titanium oxide, aluminum oxide, zirconium silicate, zirconium oxide, iron (II) oxide, iron (III) oxide, manganese dioxide, iron titanium oxide (ilmenite), chromium oxide, carbides (such as SiC, TiC or WC), or mixtures thereof. Examples of opacifying compound precursors include, but are not limited to $TiOSO_4$ or $TiOCl_2$.

Aerogel compositions can include one or more fire-class additive. Within the context of the present disclosure, the term "fire-class additive" refers to a material that has an endothermic effect in the context of reaction to fire and can be incorporated into an aerogel composition. Furthermore, in certain embodiments, fire-class additives have an onset of endothermic decomposition (ED) that is no more than 100° C. greater than the onset of thermal decomposition ($T_d$) of the aerogel composition in which the fire-class additive is present, and in certain embodiments, also an ED that is no more than 50° C. lower than the $T_d$ of the aerogel composition in which the fire-class additive is present. In other words, the $E_D$ of fire-class additives has a range of ($T_d$−50° C.) to ($T_d$+100° C.):

$$E_D \begin{cases} \text{max: } T_d + 100° \text{ C.} \\ \text{min: } T_d - 50° \text{ C.} \end{cases}$$

Prior to, concurrent with, or even subsequent to incorporation or mixing with the sol (e.g., silica sol prepared from alkyl silicates or water glass in various ways as understood in prior art), fire-class additives can be mixed with or otherwise dispersed into a medium including ethanol and optionally up to 10% vol. water. The mixture may be mixed and/or agitated as necessary to achieve a substantially uniform dispersion of additives in the medium. Without being bound by theory, utilizing a hydrated form of the above-referenced clays and other fire-class additives provides an additional endothermic effect. For example, halloysite clay (commercially available under the tradename DRAGONITE from Applied Minerals, Inc. or from Imerys simply as Halloysite), kaolinite clay are aluminum silicate clays that in hydrated form has an endothermic effect by releasing water of hydration at elevated temperatures (gas dilution). As another example, carbonates in hydrated form can release carbon dioxide on heating or at elevated temperatures.

Within the context of the present disclosure, the terms "heat of dehydration" means the amount of heat required to vaporize the water (and dihydroxylation, if applicable) from the material that is in hydrated form when not exposed to elevated temperatures. Heat of dehydration is typically expressed on a unit weight basis.

In certain embodiments, fire-class additives of the present disclosure have an onset of thermal decomposition of about 350° C. or more, about 400° C. or more, about 450° C. or more, about 500° C. or more, about 550° C. or more, about 600° C. or more, about 650° C. or more, about 700° C. or more, about 750° C. or more, about 800° C. or more, or in a range between any two of these values. In certain embodiments, fire-class additives of the present disclosure have an onset of thermal decomposition of about 440° C. or 570° C. In certain embodiments, fire-class additives of the present disclosure have an onset of thermal decomposition which is no more than 50° C. more or less than the Et of the aerogel composition (without the fire-class additive) into which the fire-class additive is incorporated, no more than 40° C. more or less, no more than 30° C. more or less, no more than 20° C. more or less, no more than 10° C. more or less, no more than 5° C. more or less, or in a range between any two of these values The fire-class additives of this disclosure include, clay materials such as, but not limited to, phyllosilicate clays (such as illite), kaolinite (aluminum silicate; $Al_2Si_2O_5(OH)_4$), halloysite (aluminum silicate; $Al_2Si_2O_5(OH)_4$)), endellite (aluminum silicate; $Al_2Si_2O_5(OH)_4$), mica (silica minerals), diaspore, gibbsite (aluminum hydroxide), montmorillonite, beidellite, pyrophyllite (aluminum silicate; $Al_2Si_4O_{10}(OH)_2$), nontronite, bravaisite, smectite, leverrierite, rectorite, celadonite, attapulgite, chloropal, volkonskoite, allophane, racewinite, dillnite, severite, miloschite, collyrite, cimolite and newtonite, magnesium hydroxide (or magnesium dihydroxide, "MDH"), alumina trihydrate ("ATH"), carbonates such as, but not limited to, dolomite and lithium carbonate. Among the clay materials, certain embodiments of the present disclosure use clay materials that have at least a partial layered structure. In certain embodiments of the present disclosure, clay materials as fire-class additives in the aerogel compositions have at least some water such as in hydrated form. The additives may be in hydrated crystalline form or may become hydrated in the manufacturing/processing of the compositions of the present invention. In certain embodiments, fire-class additive also include low melting additives that absorb heat without a change in chemical composition. An example of this class is a low melting glass, such as inert glass beads. Other additives that may be useful in the compositions of the present disclosure include, but are not limited to, wollastonite (calcium silicate) and titanium dioxide ($TiO_2$). In certain embodiments, other additives may include infrared opacifiers such as, but not limited to, titanium dioxide or silicon carbide, ceramifiers such as, but not limited to, low melting glass frit, calcium silicate or charformers such as, but not limited to, phosphates and sulfates. In certain embodiments, additives may require special processing considerations such as techniques to ensure the additives are uniformly distributed and not agglomerated heavily to cause product performance variations. The processing techniques may involve additional static and dynamic mixers, stabilizers, adjustment of process conditions and others known in the art. The amount of additives in the final aerogel compositions may depend on various other property requirements and may vary from 5% to about 70% by weight. In certain embodiments, the amount of additives in the final aerogel composition is between 10 and 60 wt % and in certain preferred embodiments, it is between 20 and 40 wt %. In certain embodiments, the additives may be of more than one type. One or more fire-class additives may also be present in the final aerogel compositions. In certain preferred embodiments which include aluminum silicate fire-class additives, the additives are present in the final aerogel compositions in about 60-70 wt %.

In certain embodiments of the present disclosure, methods are provided to prepare OCMF reinforced aerogel compositions with fire-class performance. The fire-class compositions of these embodiments also possess hydrophobicity sufficient for use as thermal insulation in industrial environments, as measured by water uptake and low thermal conductivity to help meet the ever-demanding energy conservation needs. To obtain these combinations of desirable properties, simply loading additives or even fire-class additives are not successful. While one can try various permutations and combinations or various additives and arrive at an optimized solution, such efforts are not always successful and present risks for a viable manufacturing with repeatable quality control on these desired properties. An important aspect of these embodiments is to assess the thermal behavior (assessed through thermogravimetry or differential scanning calorimetry) of the composition that would otherwise provide all desirable properties except for the fire performance and consider a fire-class additive that closely matches the onset of thermal decomposition of the underlying composition or alternatively, the temperature at which most heat is emitted with the fire-class additives' onset of thermal decomposition or the temperature at which most heat is absorbed.

In certain embodiments, the desired fire properties of the final composition may include not just the inherent property such as heat of combustion (ISO 1716), but also system fire properties such as reaction to fire performance as per ISO 1182. In the case of ISO 1182, weight loss, increase in furnace temperature, and flame time are assessed when exposed to a furnace at a temperature of about 750° C.

An OCMF reinforced aerogel composition may have various components that add fuel to the system. Additionally, it may have various other components, while not contributing as fuel, may interfere in combustion upon exposure to fire. As such, combustion behavior of such systems cannot be predicted simply based on the constituent elements. In situations where a multitude of properties are desired, in certain embodiments, the composition should be arrived at without regard to its fire property and such arrived composition's thermal performance should be assessed to find a suitable fire-class additive that will provide the fire property without compromising the other properties the starting composition was intended to provide.

In certain embodiments, onset of thermal decomposition is a critical property of the composition. In certain other embodiments, the temperature at which the peak heat release may be a critical property for the purposes of developing an enhanced fire-performing aerogel OCMF compositions. When multiple fuel components are present in the composition identified by multiple peaks in the DSC curve, such compositions are well served by matching the temperature of the peak heat release of the OCMF reinforced aerogel composition with a fire-class additive having a temperature of endothermic peak heat release within 140° C., 120° C., 100° C. or 80° C. In many embodiments, the temperature of endothermic peak heat release is within 50° C.

The aerogel materials and compositions of the present disclosure have been shown to be highly effective as insulation materials. However, application of the methods and materials of the present disclosure are not intended to be limited to applications related to insulation. The methods and materials of the present disclosure can be applied to any system or application, which would benefit from the unique combination of properties or procedures provided by the materials and methods of the present disclosure.

EXAMPLES

The following examples provide various non-limiting embodiments and properties of the present disclosure. In the examples below, the additive wt % is provided with 100% reference being the weight of the silica and hydrophobe constituents of the aerogel composition. The thermal analyses, TGA and DSC were performed using Netzsch STA449 F1 Jupitor simultaneous thermal analyzer starting at 25° C. and ramping at a rate of 20° C. per minute up to 1000° C. in air at ambient pressure. Any reference to sol hydrophobe content refers to weight of solid materials in the final aerogel composition derived from hydrophobic alkyl silanes in the sols as a percentage of the weight of the final aerogel composition.

Example 1

Polyethylsilicate sol was produced by hydrolyzing TEOS (tetraethoxysilane) in ethanol and water with sulfuric acid catalyst, and was then stirred at ambient temperature for about 16 h. Polymethylsilsesquioxane sol as produced by hydrolyzing MTES (methyl triethoxy silane) and DIVIDES (dimethyl diethoxy silane) (about 4:1 molar ratio) in ethanol and water with phosphoric acid catalyst, and was then stirred at ambient temperature for no less than 16 hours. The polyethylsilicate and polymethylsilsesquioxane (MTES+DMDES) sols were combined (about 2:1 weight ratio) to form a precursor sol which targeted 30-40 wt % of total hydrophobe content in the final aerogel composition prepared from the sol. The combined precursor sol was stirred at ambient temperature for no less than 2 hours.

Example 2

A sample of melamine OCMF material (BASOTECT UF from BASF) measuring 10 mm thick with a density of approximately 6 kg/m$^3$ was provided. A substantially uniform mixture of 70 g of magnesium dihydroxide (fire-class additive; MDH) in about 450 mL of ethanol (with up to 10% vol. water) was combined with about 540 mL of silica sol from Example 1, and stirred for no less than 5 minutes. About 10 mL of 28 wt % NH$_4$OH solution was then added, followed by at least 1 minute of stirring the sol mixture. The sol mixture was then infiltrated into the melamine OCMF material and allowed to gel, with gelation occurring within 2 minutes. The resulting gel composition was allowed to sit and cure for approximately 10 minutes. The gel composition was then aged for 16 hours at 68° C. in ethanol aging fluid containing 10 vol % H$_2$O and 1.1 wt/vol % NH$_4$OH (1.1 g of NH$_4$OH per 100 mL of fluid) at a fluid to gel composition ratio of about 1.5:1. Aging temperature and aging fluid composition may be further varied to change the overall ageing time.

The gel composition coupons (samples) where then subjected to solvent extraction by way of supercritical $CO_2$ and then dried at 120° C. for 4 hours. Target silica density was 0.07 g/cc, and the resulting material density of the aerogel composite was 0.159 g/cc. The hydrophobe content of the aerogel composition was about 4.34 wt %.

Example 3

A gel composition was produced using the same procedure as Example 2, except a mixture of 72 g of MDH in about 529 mL of ethanol (with up to 10% vol. water) was combined with about 460 mL of silica sol from Example 1. Target silica density was 0.06 g/cc, and the resulting material density of the aerogel composition was 0.185 g/cc. The hydrophobe content of the aerogel composition was about 3.97 wt %.

Example 4

A gel composition was produced using the same procedure as Example 2, except a substantially uniform mixture of 96 g of MDH in about 376 mL of ethanol (with up to 10% vol. water) was combined with about 614 mL of silica sol from Example 1. Target silica density was 0.08 g/cc, and the resulting material density of the aerogel composition was 0.178 g/cc. The hydrophobe content of the aerogel composition was about 3.97 wt %.

Example 5

A gel composition was produced using the same procedure as Example 2, except a substantially uniform mixture of 84 g of MDH in about 539 mL of ethanol (with up to 10% vol. water) was combined with about 460 mL of silica sol from Example 1. Target silica density was 0.06 g/cc, and the resulting material density of the aerogel composition was 0.142 g/cc. The hydrophobe content of the aerogel composition was about 3.6 wt %.

Example 6

A gel composition was produced using the same procedure as Example 2, except a substantially uniform mixture of about 529 mL of ethanol (with up to 10% vol. water; no fire-class additives) was combined with about 460 mL of silica sol from Example 1. Target silica density was 0.06 g/cc, and the resulting material density of the aerogel composition was 0.074 g/cc. The hydrophobe content of the aerogel composition was about 8.3 wt %.

Example 7

A gel composition was produced using the same procedure as Example 2, except a substantially uniform mixture of 72 g of inert glass beads (fire-class additive) in about 529 mL of ethanol (with up to 10% vol. water) was combined with about 460 mL of silica sol from Example 1. Target silica density was 0.06 g/cc, and the resulting material density of the aerogel composition was 0.141 g/cc. The hydrophobe content of the aerogel composition was about 3.93 wt %.

Example 8

A gel composition was produced using the same procedure as Example 2, except a substantially uniform mixture of 60 g of wollastonite (commercially available as NYAD) in about 529 mL of ethanol solvent was combined with about 460 mL of silica sol from Example 1. Target silica density was 0.06 g/cc, and the resulting material density of the aerogel composition was 0.161 g/cc. The hydrophobe content of the aerogel composition was about 3.95 wt %.

Example 9

A gel composition was produced using the same procedure as Example 2, except a substantially uniform mixture of 72 g of titanium dioxide (fire-class additive; $TiO_2$) in about 529 mL of ethanol (with up to 10% vol. water) was combined with about 460 mL of silica sol from Example 1. Target silica density was 0.06 g/cc, and the resulting material density of the aerogel composition was 0.159 g/cc. The hydrophobe content of the aerogel composition was about 3.95 wt %.

Example 10

A sample of polyurethane OCMF material measuring 10 mm thick with a density of approximately 23 kg/m$^3$ was provided. A substantially uniform mixture of 60 g of MDH (fire-class additive) in about 529 mL of ethanol (with up to 10% vol. water) was combined with about 460 mL of silica sol from Example 1, and stirred for no less than 5 minutes. About 10 mL of 28 vol % $NH_4OH$ solution was then added, followed by at least 1 minute of stirring the sol mixture. The sol mixture was then infiltrated into the polyurethane OCMF material and allowed to gel, within gelation occurring within 2 minutes. The resulting gel composite was allowed to sit and cure for approximately 10 minutes. The gel composite was then aged for 16 h at 68° C. in ethanol aging fluid containing 10 vol % $H_2O$ and 1.1 wt/vol % $NH_4OH$ (1.1 g of $NH_4OH$ per 100 mL of fluid) at a fluid to gel composition ratio of about 1.5:1.

The gel composition coupons (samples) were then subjected to solvent extraction by way of supercritical $CO_2$ and then dried at 120° C. for 4 hours. Target silica density was 0.06 g/cc, and the resulting material density of the aerogel composition was 0.165 g/cc. The hydrophobe content of the aerogel composition was about 3.95 wt %.

Example 11

Polyethylsilicate sol was produced by hydrolyzing TEOS in EtOH and $H_2O$ with sulfuric acid catalyst, and was then stirred at ambient temperature for no less than 16 h. Polymethylsilsesquioxane sol as produced by hydrolyzing MTES and DIVIDES (about 8:1 molar ratio) in EtOH and $H_2O$ with acetic acid catalyst, and was then stirred at ambient temperature for no less than 16 hours. Polyethylsilicate (TEOS) and polymethylsilsesquioxane (MTES+DMDES) sols were combined (about 10:1 weight ratio) to form a silica sol which targeted a sol hydrophobe content of about 12 wt % in the final aerogel composition. The combined silica sol was stirred at ambient temperature for no less than 2 hours.

Example 12

A sample of melamine OCMF material measuring 10 mm thick with a density of approximately 6 kg/m$^3$ was provided. A substantially uniform mixture of 60 g of MDH (fire-class additive) in about 718 mL of ethanol (with up to 10% vol. water) was combined with about 266 mL of silica sol from Example 11, and stirred for no less than 5 minutes. About 10 mL of 28 wt % NH$_4$OH solution was then added, followed by at least 1 minute of stirring the sol mixture. The sol mixture was then infiltrated into the melamine OCMF material and allowed to gel, within gelation occurring within 2 minutes. The resulting gel composite was allowed to sit and cure for approximately 10 minutes. The gel composition was then treated for 16 h at 68° C. in ethanol containing 0.12M trimethlysilyl derivatives of hexamethyldisilazane ("TMS"), 8 vol % H$_2$O and 0.8 g of NH$_4$OH$_3$ per 100 mL of ethanol at a fluid to gel composition ratio of about 1.5:1.

The gel composition coupons where then subjected to solvent extraction by way of supercritical CO$_2$ and then dried at 120° C. for 4 hours. Target silica density was 0.05 g/cc, and the resulting material density of the aerogel composition was 0.176 g/cc.

Example 13

A gel composition was produced using the same procedure as Example 12, except a substantially uniform mixture of about 718 mL of ethanol solvent (no fire-class additive) was combined with about 256 mL of silica sol from Example 8. Target silica density was 0.05 g/cc, and the resulting material density of the aerogel composition was 0.081 g/cc.

Example 14

A gel composite material was produced using the same procedure as Example 11, except the polyethylsilicate (TEOS) and polymethylsilsesquioxane (MTES+DMDES) sols were combined at about 7:1 weight ratio to form a silica sol which targeted a 16 wt % of total hydrophobe content in the final aerogel composition.

Example 15

A gel composition was produced using the same procedure as Example 12, except a substantially uniform mixture of 72 g of MDH (fire-class additive) in about 668 mL of ethanol solvent was combined with about 317 mL of silica sol from Example 14. Target silica density was 0.06 g/cc, and the resulting material density of the aerogel composition was 0.195 g/cc. Using thermogravimetric curves, the onset of thermal decomposition was found to be 399.5° C., and using DSC curves, the temperature of peak heat release was found to be 439.6° C. The extrapolated onset of thermal decomposition of the composition including the fire-class additive was measured using thermogravimetric curves as 395.8° C., and the temperature of peak heat release was measured using DSC curve as 560.9° C.

For comparison, a composition within this example without any fire-class additive was found to have an extrapolated onset of thermal decomposition of 369.4° C., as measured using thermogravimetric curves, and the temperature of peak heat release was found to be 607.9° C., as measured using DSC curves.

Example 16

A gel composition was produced using the same procedure as Example 12, except a mixture of about 668 mL of ethanol solvent (no fire-class additive) was combined with about 317 mL of silica sol from Example 14. Target silica density was 0.06 g/cc, and the resulting material density of the aerogel composition was 0.092 g/cc.

Example 17

Polyethylsilicate sol was produced by hydrolyzing TEOS in ethanol and water with sulfuric acid catalyst, and was then stirred at ambient temperature for about 16 hours. This hydrophobe-free sol was used without the addition of any polymethylsilsesquioxane sol or other hydrophobic material.

Example 18

A gel composite material was produced using the same procedure as Example 12, except a mixture of about 662 mL of ethanol solvent (no fire-class additive) was combined with about 328 mL of silica sol from Example 17 and allowed to gel. The gel was treated with a solution containing 0.3 M TMS in ethanol (8 vol % H$_2$O and 0.8 g NH$_4$OH per 100 mL of ethanol at a fluid to gel composite ratio of about 1.5:1) for 16 hours at 68° C. Target silica density was 0.06 g/cc, and the resulting material density of the aerogel composite was 0.086 g/cc.

Example 19

A gel composite material was produced using the same procedure as Example 12, except a mixture of about 662 mL of ethanol solvent (no fire-class additive) was combined with about 328 mL of silica sol from Example 17 and allowed to gel. The gel was treated with a solution containing 0.6 M MTES (8 vol % H$_2$O and 0.8 g NH$_4$OH per 100 mL of ethanol at a fluid to gel composite ratio of about 1.5:1) for 16 hours at 68° C. Target silica density was 0.06 g/cc, and the resulting material density of the aerogel composite was 0.103 g/cc.

Example 20

A gel composite material was produced using the same procedure as Example 2, except a substantially uniform mixture of 112 g of halloysite clay (fire-class additive; DRAGONITE) in about 453 mL of ethanol (with up to 8% vol. water) was combined with about 537 mL of silica sol from Example 1. Target silica density was 0.07 g/cc, and the resulting material density of the aerogel composite was 0.196 g/cc. The hydrophobe content of the aerogel composition was about 3.37 wt %.

Example 21

A gel composite material was produced using the same procedure as Example 2, except a substantially uniform mixture of 72 g of halloysite clay (fire-class additive; DRAGONITE) in about 529 mL of ethanol (with up to 10% vol. water) was combined with about 460 mL of silica sol from Example 1. Target silica density was 0.06 g/cc, and the resulting material density of the aerogel composite was 0.128 g/cc. The hydrophobe content of the aerogel composition was about 3.91 wt %. The onset of thermal decomposition was measured using thermogravimetric curves as 492.9° C., and the temperature of peak heat release was measured using DSC curve as 565.9° C. The extrapolated onset of thermal decomposition of the composition including the fire-class additive was measured using thermogravimetric curves as 370.9° C., and the temperature of peak heat release was measured using DSC curve as 565.9° C.

For comparison, a composition within this example without any fire-class additive was found to have an extrapolated onset of thermal decomposition of 369.4° C., as measured using thermogravimetric curves, and the temperature of peak heat release was found to be 607.9° C., as measured using DSC curves.

Example 22

A gel composite material was produced using the same procedure as Example 2, except a substantially uniform mixture of two fire-class additives-36 g of halloysite clay (DRAGONITE) and 36 g of alumina trihydrate (ATH)—in about 529 mL of ethanol (with up to 10% vol. water) was combined with about 460 mL of silica sol from Example 1. Target silica density was 0.06 g/cc, and the resulting material density of the aerogel composite was 0.149 g/cc. The hydrophobe content of the aerogel composition was about 3.94 wt %.

Example 23

A gel composite material was produced using the same procedure as Example 2, except a substantially uniform mixture of 72 g of alumina trihydrate (ATH) in about 529 mL of ethanol (with up to 10% vol. water) was combined with about 460 mL of silica sol from Example 1. Target silica density was 0.06 g/cc, and the resulting material density of the aerogel composite was 0.152 g/cc. The hydrophobe content of the aerogel composition was about 3.94 wt %. Using thermogravimetric curves, the onset of thermal decomposition was measured as 289.8° C., and the temperature of peak heat release was measured using DSC curve as 334.1° C.

For comparison, a composition within this example without any fire-class additive was found to have an extrapolated onset of thermal decomposition of 369.4° C., as measured using thermogravimetric curves, and the temperature of peak heat release was found to be 607.9° C., as measured using DSC curves.

Example 24

A gel composite material was produced using the same procedure as Example 12, except a substantially uniform mixture of 100 g of halloysite clay (DRAGONITE) in about 558 mL of ethanol (with up to 10% vol. water) was combined with about 426 mL of silica sol from Example 11, which had been combined in such a manner to target 28 wt % hydrophobe content. Target silica density was 0.083 g/cc, and the resulting material density of the aerogel composite was 0.184 g/cc.

Example 25

A gel composition was produced using the same procedure as Example 2, except a substantially uniform mixture of 56 g of halloysite clay (DRAGONITE from Applied Minerals, Inc.) and 56 g of ATH in about 453 mL of ethanol (with up to 8% vol. water) was combined with about 537 mL of silica sol from Example 1. Target silica density was 0.07 g/cc, and the resulting material density of the aerogel composite was 0.196 g/cc. The hydrophobe content of the aerogel composition was about 3.36 wt %.

Table 1 is presented below, illustrating the composition of the foregoing examples. The term "wt % loading" refers to the amount of additive loaded into the composition based on the amount of silica present. For example, a "wt % loading" of 120% indicates that for every 100 g of silica in the composition, 120 g of additive is loaded.

TABLE 1

Composition from examples.

| Example # | Sol Hydrophobe Content (%) | Target Silica Density (g/cc) | Additive Type | wt % Loading |
|---|---|---|---|---|
| 2 | 36 | 0.07 | MDH | 100 |
| 3 | 36 | 0.06 | MDH | 120 |
| 4 | 36 | 0.08 | MDH | 120 |
| 5 | 36 | 0.06 | MDH | 140 |
| 6 | 36 | 0.06 | None | 0 |
| 7 | 36 | 0.06 | Inert Glass Beads | 120 |
| 8 | 36 | 0.06 | Wollastonite | 120 |
| 9 | 36 | 0.06 | Titanium dioxide | 120 |
| 10 | 36 | 0.06 | MDH | 120 |
| 12 | 12 | 0.05 | MDH | 120 |
| 13 | 12 | 0.05 | None | 0 |
| 15 | 16 | 0.06 | MDH | 120 |
| 16 | 16 | 0.06 | None | 0 |
| 18 | 0 | 0.06 | None | 0 |
| 19 | 0 | 0.06 | None | 0 |
| 20 | 36 | 0.07 | Halloysite clay | 160 |
| 21 | 36 | 0.06 | Halloysite clay | 120 |
| 22 | 36 | 0.06 | Halloysite clay + ATH | 120 |
| 23 | 36 | 0.06 | ATH | 120 |
| 24 | 28 | 0.083 | Halloysite clay | 120 |
| 25 | 36 | 0.07 | Halloysite clay + ATH | 160 |

Table 2 presents measurements of density, TC, liquid water uptake, HOC, FTR, flame time, and mass loss for the exemplary composites of Table 1.

TABLE 2

Resulting properties from examples.

| Example # | Composite Density (g/cc) | TC (mW/m-K) | Liquid Water Uptake (wt %) | HOC (cal/g) | Furnace Temp Rise (° C.) | Flame Time (s) | Mass Loss (wt %) |
|---|---|---|---|---|---|---|---|
| 2 | 0.159 | 18.6 | 4.4 | 670.4 | 32 | 0 | 28.8 |
| 3 | 0.185 | 20.1 | 5.1 | 492.7 | 35.5 | 0 | 44.1 |
| 4 | 0.178 | 17.8 | 5.6 | 584.7 | 40.1 | 0 | 19.1 |
| 5 | 0.142 | 18.4 | 2.8 | 668.6 | 32.7 | 0 | 17.7 |
| 6 | 0.074 | 15.2 | 8.5 | 1599.9 | 194.8 | 81 | 18.1 |
| 7 | 0.141 | 19.5 | 6.4 | 714.8 | 81.7 | 120 | 10.9 |
| 8 | 0.161 | 19.6 | 4.6 | 616 | 41.1 | 13 | 20.7 |
| 9 | 0.159 | 16.1 | 4.2 | 797 | 45 | 35 | 43.6 |
| 10 | 0.165 | 19.2 | 2.0 | 1196 | 81 | 50 | 38.5 |
| 12 | 0.176 | 15.5 | 4.5 | 684.1 | 44.9 | 0 | 47.6 |
| 13 | 0.081 | 14.8 | 3.7 | 1920.6 | 153.9 | 76 | 26.5 |
| 15 | 0.195 | 18.5 | 8.8 | 486.1 | 41.8 | 0 | 34.9 |

TABLE 2-continued

Resulting properties from examples.

| Example # | Composite Density (g/cc) | TC (mW/m-K) | Liquid Water Uptake (wt %) | HOC (cal/g) | Furnace Temp Rise (° C.) | Flame Time (s) | Mass Loss (wt %) |
|---|---|---|---|---|---|---|---|
| 16 | 0.092 | 14.7 | 3.1 | 1886.9 | 112 | 110 | 16.6 |
| 18 | 0.086 | 14.2 | 4.5 | 1966 | 178.9 | 100 | 18.0 |
| 19 | 0.103 | 14.9 | 26.1 | 1433 | 95.1 | 109 | 15.3 |
| 20 | 0.196 | 17.2 | 4.8 | 621 | 10.0 | 0 | 17.8 |
| 21 | 0.128 | 17.7 | 3.7 | 747 | 40.2 | 5 | 16.1 |
| 22 | 0.149 | 16.3 | 3.8 | 785 | 49.3 | 70 | 22.2 |
| 23 | 0.152 | 16.4 | 3.1 | 733 | 34.0 | 33 | 27.2 |
| 24 | 0.184 | 15.7 | 2.3 | 783 | 38.8 | 0 | 19.6 |
| 25 | 0.184 | 18.5 | <5 | 600 | 9.3 | 10 | 22.4 |

Still referring to Table 2, density measurements were completed according to ASTM C167. All aerogel composition samples had measured densities below 0.2 g/cc. TC measurements were completed according to ASTM C518 at a temperature of about 37.5° C. and a compression of 2 psi. All aerogel composition samples had thermal conductivity measurements at or below 20.1 mW/m-K. Measurements of liquid water uptake were made according ASTM C1511 (under 15 minute submersion in ambient conditions). All aerogel composition samples had a liquid water uptake below 5 wt %. HOC measurements were made per ISO 1716 measurement standards. All aerogel composition samples had a HOC below 690 cal/g. FTR measurements were made per ISO 1182 Criterion A.1. All aerogel composition samples had a FTR below 50° C. Flame time measurements were made per ISO 1182 Criterion A.2. All of these samples had a measured flame time of 20 seconds. Mass Loss measurements were completed according to ISO 1182 Criterion A.3. All other aerogel composition samples had a mass loss below 50 wt %.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A reinforced aerogel composition comprising:
a reinforced silica-based aerogel material that includes:
a reinforcement material comprising an open-cell macroporous framework (OCMF) material;
a silica-based aerogel material incorporated with the reinforcement material; and an endothermic fire-class additive incorporated with the reinforced aerogel composition; wherein:
the reinforced silica-based aerogel material has an onset of thermal decomposition temperature; and
the endothermic fire-class additive has an onset of thermal decomposition temperature that is within 50° C. of the onset of thermal decomposition temperature of reinforced silica-based aerogel material.

2. The reinforced aerogel composition of claim 1, wherein the endothermic fire-class additive is present in the reinforced aerogel composition in about 5 wt % to 70 wt %.

3. The reinforced aerogel composition of claim 1, wherein the OCMF material comprises a melamine based OCMF material.

4. The reinforced aerogel composition of claim 1, wherein the OCMF material comprises a sheet of OCMF material.

5. The reinforced aerogel composition of claim 1, wherein the OCNI material comprises a foam material.

6. The reinforced aerogel composition of claim 1, wherein the reinforced silica-based aerogel material further comprises a hydrophobe.

7. The reinforced aerogel composition of claim 6, wherein the OCMF material comprises a flammable material, a combustible material, or both.

8. The reinforced aerogel composition of claim 1, wherein the reinforced aerogel composition has an onset of thermal decomposition of from 280° C. to 390° C.

9. The reinforced aerogel composition of claim 1, wherein the endothermic fire-class additive comprises halloysite clay.

10. The reinforced aerogel composition of claim 1, wherein the endothermic fire-class additive does not include kaolin or hydrated alumina.

11. The reinforced aerogel composition of claim 1, wherein the onset of thermal decomposition temperature of the endothermic fire-class additive corresponds to dehydration or dihydroxylation.

12. The reinforced aerogel composition of claim 1, wherein the reinforced aerogel composition is characterized by:
i) a liquid water uptake of 20 wt % or less;
ii) a thermal conductivity of 30 mW/M*K or less according to ASTM C518 standard at a temperature of about 37.5 ° C., in an ambient environment, at atmospheric pressure, and at a compression load of about 2 psi.

13. A reinforced aerogel composition comprising:
a reinforced silica-based aerogel material that includes:
a reinforcement material comprising an open-cell macroporous framework (OCMF) material;
a silica-based aerogel material incorporated with the reinforcement material; and an endothermic fire-class additive incorporated with the reinforced aerogel composition; wherein:
the reinforced silica-based aerogel material has a first exothermic heat of decomposition; and
the endothermic fire-class additive has a second exothermic heat of decomposition that is at least 30% of the first exothermic heat of decomposition.

14. The reinforced aerogel composition of claim 13, wherein the endothermic fire-class additive is present in the reinforced aerogel composition in about 5 wt % to 70 wt %.

15. The reinforced aerogel composition of claim 13, wherein the OCMF material comprises or is a melamine based OCMF material.

16. The reinforced aerogel composition of claim 13, wherein the OCMIF material comprises a sheet of OCMF material.

17. The reinforced aerogel composition of claim 13, wherein the OCMF material comprises a foam material.

18. The reinforced aerogel composition of claim 13, herein the reinforced silica-based aerogel material further comprises a hydrophobe.

19. The reinforced aerogel composition of claim 18, wherein the OCMIF material comprises a flammable material, a combustible material, or both.

20. The reinforced aerogel composition of claim 13, wherein the reinforced aerogel composition has an onset of thermal decomposition of from 350° C. to 390° C.

21. The reinforced aerogel composition of claim 13, wherein the endothermic fire-class additive comprises halloysite clay.

22. The reinforced aerogel composition of claim 13, wherein the first exothermic heat of decomposition of the reinforced silica-based aerogel material is from 625 cal/g to 700 cal/g according to EN ISO 1716 standard.

23. The reinforced aerogel composition of claim 13, further comprising at least two fire-class additives, wherein the respective onsets of thermal decomposition of the at least two fire-class additives are at least 10° C. apart.

24. The reinforced aerogel composition of claim 13, wherein the endothermic fire-class additive does not include kaolin or hydrated alumina.

* * * * *